US007862427B2

(12) United States Patent
Nguyen et al.

(10) Patent No.: US 7,862,427 B2
(45) Date of Patent: Jan. 4, 2011

(54) WIDE AREA PROGRESSIVE JACKPOT SYSTEM AND METHODS

(75) Inventors: Binh T. Nguyen, Reno, NV (US); James Stockdale, Clio, CA (US); Craig A. Paulsen, Reno, NV (US)

(73) Assignee: IGT, Reno, NV (US)

( * ) Notice: Subject to any disclaimer, the term of this patent is extended or adjusted under 35 U.S.C. 154(b) by 669 days.

(21) Appl. No.: 10/958,843

(22) Filed: Oct. 4, 2004

(65) Prior Publication Data

US 2006/0073887 A1 Apr. 6, 2006

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ............................ 463/27; 463/16; 463/17; 463/18; 463/19; 463/20; 463/21; 463/22; 463/25; 463/40; 463/41; 463/42

(58) Field of Classification Search .................... 463/27
See application file for complete search history.

(56) References Cited

U.S. PATENT DOCUMENTS

| | | | |
|---|---|---|---|
| 3,662,105 | A | 5/1972 | Hurst et al. |
| 4,071,689 | A | 1/1978 | Talmage et al. |
| 4,335,809 | A | 6/1982 | Wain |
| 4,342,454 | A | 8/1982 | Baer et al. |
| 4,356,391 | A | 10/1982 | Takeda |
| 4,689,742 | A | 8/1987 | Troy et al. |
| 4,695,053 | A | 9/1987 | Vazquez, Jr. et al. |
| 4,764,666 | A | 8/1988 | Bergeron |
| 4,837,728 | A | 6/1989 | Barrie et al. |
| 5,043,889 | A | 8/1991 | Lucey |
| 5,073,700 | A | 12/1991 | D'Onofrio |
| 5,110,129 | A | 5/1992 | Alvarez |
| 5,116,055 | A | 5/1992 | Tracy |
| 5,212,369 | A | 5/1993 | Karlisch et al. |

(Continued)

FOREIGN PATENT DOCUMENTS

| | | |
|---|---|---|
| AU | 704691 | 4/1997 |

(Continued)

OTHER PUBLICATIONS

European Office Action dated Dec. 20, 2005 from a related EP Application No. 02773484.7 (3 pages).

(Continued)

*Primary Examiner*—John M. Hotaling, II
*Assistant Examiner*—Paul A. D'Agostino
(74) *Attorney, Agent, or Firm*—Weaver Austin Villeneuve and Sampson LLP

(57) ABSTRACT

A progressive jackpot system for allowing access to multiple wide area progressive jackpots at a gaming machine is described. The gaming machine connected to the progressive systems can be switched between two or more different progressive games where each progressive game provides the chance to win a different wide area progressive jackpot. The gaming machine may be operable to dynamically connect to and communicate with one or more different progressive systems. Switches can be triggered based upon a player input at the gaming machine or based upon a command received from a remote gaming device.

47 Claims, 10 Drawing Sheets

U.S. PATENT DOCUMENTS

| | | | | | |
|---|---|---|---|---|---|
| 5,265,874 | A | | 11/1993 | Dickinson et al. | |
| 5,277,424 | A | | 1/1994 | Wilms | |
| 5,280,809 | A | | 1/1994 | Tive | |
| 5,280,909 | A | | 1/1994 | Tracy | |
| 5,286,023 | A | * | 2/1994 | Wood | 463/20 |
| 5,395,242 | A | | 3/1995 | Slye et al. | |
| 5,429,361 | A | | 7/1995 | Raven et al. | |
| 5,452,379 | A | | 9/1995 | Poor | |
| 5,470,079 | A | | 11/1995 | LeStrange et al. | |
| 5,475,740 | A | | 12/1995 | Biggs, Jr. et al. | |
| 5,488,411 | A | | 1/1996 | Lewis | |
| 5,494,287 | A | | 2/1996 | Manz | |
| 5,536,016 | A | | 7/1996 | Thompson | |
| 5,537,314 | A | | 7/1996 | Kanter | |
| 5,577,731 | A | | 11/1996 | Jones | |
| 5,586,936 | A | | 12/1996 | Bennett et al. | |
| 5,605,334 | A | | 2/1997 | McCrea, Jr. | |
| 5,638,426 | A | | 6/1997 | Lewis | |
| 5,655,961 | A | * | 8/1997 | Acres et al. | 463/27 |
| 5,679,007 | A | | 10/1997 | Potdevin et al. | |
| 5,679,077 | A | | 10/1997 | Pocock et al. | |
| 5,702,304 | A | | 12/1997 | Acres et al. | |
| 5,704,835 | A | | 1/1998 | Dietz, II | |
| 5,707,286 | A | * | 1/1998 | Carlson | 463/16 |
| 5,759,102 | A | | 6/1998 | Pease et al. | |
| 5,761,647 | A | | 6/1998 | Boushy | |
| 5,766,076 | A | | 6/1998 | Pease et al. | |
| 5,770,533 | A | | 6/1998 | Franchi | |
| 5,779,545 | A | | 7/1998 | Berg et al. | |
| 5,779,548 | A | | 7/1998 | Asai et al. | |
| 5,788,573 | A | | 8/1998 | Baerlocher et al. | |
| 5,796,389 | A | | 8/1998 | Bertram et al. | |
| 5,800,268 | A | | 9/1998 | Molnick | |
| 5,803,809 | A | | 9/1998 | Yoseloff | |
| 5,809,482 | A | | 9/1998 | Strisower | |
| 5,811,772 | A | | 9/1998 | Lucero | |
| 5,816,918 | A | | 10/1998 | Kelly et al. | |
| 5,820,459 | A | | 10/1998 | Acres et al. | |
| 5,823,873 | A | | 10/1998 | Moody | |
| 5,830,067 | A | | 11/1998 | Graves et al. | |
| 5,833,536 | A | | 11/1998 | Davids et al. | |
| 5,833,540 | A | | 11/1998 | Miodunski et al. | |
| 5,851,148 | A | | 12/1998 | Brune et al. | |
| 5,851,149 | A | | 12/1998 | Xidos et al. | |
| 5,855,515 | A | | 1/1999 | Pease et al. | |
| D406,612 | S | | 3/1999 | Johnson | |
| 5,885,158 | A | | 3/1999 | Torango et al. | |
| 5,902,983 | A | | 5/1999 | Crevelt et al. | |
| 5,919,091 | A | | 7/1999 | Bell et al. | |
| 5,951,011 | A | | 9/1999 | Potter et al. | |
| 5,951,397 | A | | 9/1999 | Dickinson | |
| 5,957,776 | A | | 9/1999 | Hoehne | |
| 5,967,896 | A | | 10/1999 | Jorasch et al. | |
| 5,971,271 | A | | 10/1999 | Wynn et al. | |
| 5,983,196 | A | | 11/1999 | Wendkos | |
| 5,984,779 | A | | 11/1999 | Bridgeman et al. | |
| 5,990,885 | A | | 11/1999 | Gopinath | |
| 6,001,016 | A | | 12/1999 | Walker et al. | |
| 6,003,013 | A | | 12/1999 | Boushy | |
| 6,003,651 | A | | 12/1999 | Walker et al. | |
| 6,004,211 | A | | 12/1999 | Brenner et al. | |
| 6,007,426 | A | | 12/1999 | Kelly et al. | |
| 6,010,404 | A | | 1/2000 | Walker et al. | |
| 6,012,983 | A | | 1/2000 | Walker et al. | |
| 6,015,344 | A | | 1/2000 | Kelly et al. | |
| 6,032,955 | A | | 3/2000 | Luciano et al. | |
| 6,048,269 | A | | 4/2000 | Burns et al. | |
| 6,050,895 | A | | 4/2000 | Luciano, Jr. et al. | |
| 6,062,981 | A | | 5/2000 | Luciano, Jr. | |
| 6,068,552 | A | | 5/2000 | Walker et al. | |
| 6,070,878 | A | * | 6/2000 | Jones et al. | 273/309 |
| 6,077,163 | A | | 6/2000 | Walker et al. | |
| 6,089,975 | A | | 7/2000 | Dunn | |
| 6,099,408 | A | | 8/2000 | Schneier et al. | |
| 6,110,041 | A | | 8/2000 | Walker et al. | |
| 6,110,043 | A | | 8/2000 | Olsen | |
| 6,113,492 | A | | 9/2000 | Walker et al. | |
| 6,113,493 | A | | 9/2000 | Walker et al. | |
| 6,113,495 | A | | 9/2000 | Walker et al. | |
| 6,146,273 | A | | 11/2000 | Olsen | |
| 6,149,522 | A | | 11/2000 | Alcorn et al. | |
| 6,152,822 | A | | 11/2000 | Herbert | |
| 6,162,121 | A | | 12/2000 | Morro et al. | |
| 6,162,122 | A | | 12/2000 | Acres et al. | |
| 6,165,072 | A | | 12/2000 | Davis et al. | |
| 6,183,362 | B1 | | 2/2001 | Boushy | |
| 6,186,404 | B1 | | 2/2001 | Ehrhart et al. | |
| 6,203,010 | B1 | * | 3/2001 | Jorasch et al. | 273/138.1 |
| 6,203,427 | B1 | | 3/2001 | Walker et al. | |
| 6,210,275 | B1 | | 4/2001 | Olsen | |
| 6,241,608 | B1 | * | 6/2001 | Torango | 463/27 |
| 6,264,560 | B1 | | 7/2001 | Goldberg et al. | |
| 6,264,561 | B1 | | 7/2001 | Saffari | |
| 6,270,409 | B1 | | 8/2001 | Shuster | |
| 6,272,223 | B1 | * | 8/2001 | Carlson | 380/251 |
| 6,287,202 | B1 | | 9/2001 | Pascal et al. | |
| 6,293,866 | B1 | | 9/2001 | Walker et al. | |
| 6,302,790 | B1 | | 10/2001 | Brossard | |
| 6,315,665 | B1 | | 11/2001 | Faith | |
| 6,319,125 | B1 | | 11/2001 | Acres | |
| 6,325,375 | B1 | * | 12/2001 | Potter et al. | 273/292 |
| 6,343,988 | B1 | | 2/2002 | Walker et al. | |
| 6,346,044 | B1 | | 2/2002 | McCrea, Jr. | |
| 6,358,149 | B1 | * | 3/2002 | Schneider et al. | 463/27 |
| 6,375,567 | B1 | * | 4/2002 | Acres | 463/25 |
| 6,394,907 | B1 | | 5/2002 | Rowe | |
| 6,409,602 | B1 | | 6/2002 | Wiltshire et al. | |
| 6,439,993 | B1 | | 8/2002 | O'Halloran | |
| 6,450,885 | B2 | | 9/2002 | Schneier et al. | |
| 6,450,887 | B1 | * | 9/2002 | Mir et al. | 463/42 |
| 6,456,977 | B1 | | 9/2002 | Wang | |
| 6,471,591 | B1 | | 10/2002 | Crumby | |
| 6,478,676 | B1 | | 11/2002 | Dayan | |
| 6,511,377 | B1 | | 1/2003 | Weiss | |
| 6,554,709 | B1 | | 4/2003 | Brenner et al. | |
| 6,572,477 | B2 | | 6/2003 | Hightower | |
| 6,585,592 | B1 | | 7/2003 | Crumby | |
| 6,589,115 | B2 | * | 7/2003 | Walker et al. | 463/20 |
| 6,592,458 | B1 | | 7/2003 | Ho | |
| 6,599,193 | B2 | | 7/2003 | Baerlocher et al. | |
| 6,645,068 | B1 | | 11/2003 | Kelly et al. | |
| 6,645,077 | B2 | | 11/2003 | Rowe | |
| 6,675,152 | B1 | | 1/2004 | Prasad et al. | |
| 6,685,567 | B2 | | 2/2004 | Cockerille et al. | |
| 6,709,333 | B1 | | 3/2004 | Bradford et al. | |
| 6,712,698 | B2 | | 3/2004 | Paulsen et al. | |
| 6,722,985 | B2 | | 4/2004 | Criss-Puszkiewicz et al. | |
| 6,724,385 | B2 | | 4/2004 | Takatsuka et al. | |
| 6,743,098 | B2 | | 6/2004 | Urie et al. | |
| 6,758,757 | B2 | | 7/2004 | Luciano, Jr. et al. | |
| 6,776,715 | B2 | | 8/2004 | Price | |
| 6,804,763 | B1 | | 10/2004 | Stockdale et al. | |
| 6,852,031 | B1 | | 2/2005 | Rowe | |
| 6,863,608 | B1 | | 3/2005 | LeMay et al. | |
| 6,866,586 | B2 | | 3/2005 | Oberberger et al. | |
| 6,884,170 | B2 | | 4/2005 | Rowe | |
| 6,979,266 | B2 | | 12/2005 | Lemay et al. | |
| 7,008,319 | B2 | | 3/2006 | Montgomery et al. | |
| 7,481,430 | B1 | | 1/2009 | Jackson et al. | |
| 2001/0028147 | A1 | | 10/2001 | Ornstein et al. | |
| 2001/0036858 | A1 | | 11/2001 | McNutt et al. | |
| 2002/0042297 | A1 | | 4/2002 | Torango | |
| 2002/0077712 | A1 | | 6/2002 | Safaei et al. | |
| 2002/0098888 | A1 | | 7/2002 | Rowe et al. | |

| | | | | |
|---|---|---|---|---|
| 2002/0103027 | A1 | 8/2002 | Rowe et al. | |
| 2002/0142815 | A1 | 10/2002 | Candelore | |
| 2002/0142825 | A1 | 10/2002 | Lark et al. | |
| 2002/0142846 | A1 | 10/2002 | Paulsen | |
| 2002/0147047 | A1 | 10/2002 | Letovsky et al. | |
| 2002/0147640 | A1 | 10/2002 | Daniele et al. | |
| 2002/0151366 | A1 | 10/2002 | Walker et al. | |
| 2002/0155874 | A1* | 10/2002 | Byrne | 463/16 |
| 2002/0193160 | A1* | 12/2002 | Tarantino | 463/20 |
| 2002/0198052 | A1 | 12/2002 | Soltys et al. | |
| 2003/0027630 | A1* | 2/2003 | Kelly et al. | 463/27 |
| 2003/0050806 | A1 | 3/2003 | Friesen et al. | |
| 2003/0073497 | A1 | 4/2003 | Nelson | |
| 2003/0083943 | A1 | 5/2003 | Adams et al. | |
| 2003/0100361 | A1* | 5/2003 | Sharpless et al. | 463/25 |
| 2003/0148808 | A1 | 8/2003 | Price | |
| 2003/0190944 | A1 | 10/2003 | Manfredi | |
| 2003/0203756 | A1 | 10/2003 | Jackson | |
| 2004/0002379 | A1 | 1/2004 | Parrott et al. | |
| 2004/0087370 | A1 | 5/2004 | Tarantino | |
| 2004/0116174 | A1 | 6/2004 | Baerlocher et al. | |
| 2004/0147314 | A1 | 7/2004 | LeMay et al. | |
| 2005/0003883 | A1 | 1/2005 | Muir et al. | |
| 2005/0170890 | A1 | 8/2005 | Rowe et al. | |

FOREIGN PATENT DOCUMENTS

| | | | |
|---|---|---|---|
| DE | 4403688 | A1 | 8/1995 |
| DE | 19905076 | | 5/2000 |
| DE | 19944140 | | 3/2001 |
| EP | 0769 769 | | 4/1997 |
| EP | 0887753 | | 12/1998 |
| EP | 1039423 | | 9/2000 |
| EP | 1087323 | | 3/2001 |
| EP | 1136930 | | 3/2001 |
| EP | 1396829 | A2 | 3/2004 |
| EP | 1 482 459 | | 12/2004 |
| GB | 2383880 | A | 7/2003 |
| WO | 98/50876 | | 11/1998 |
| WO | 00/38089 | | 6/2000 |
| WO | 00/76239 | | 12/2000 |
| WO | 00/79489 | | 12/2000 |
| WO | 01/75815 | | 10/2001 |
| WO | 01/81093 | | 10/2001 |
| WO | 02/01458 | A2 | 1/2002 |
| WO | 02/24288 | | 3/2002 |
| WO | 02/77935 | | 3/2002 |
| WO | WO 2004/027584 | | 4/2004 |
| WO | 2004/056432 | | 7/2004 |
| WO | 2005/028056 | | 3/2005 |

OTHER PUBLICATIONS

Wang Z et al.; "Casino Technology: Player Tracking and Slot Accounting Systems" Gaming Research and Review Journal, UNLV International Gaming Institute, Las Vegas, NV, U.S. vol. 6, No. 1, 2000, pp. 43-56, XP001149561, ISSN: 1531-0930, the whole document (14 pages).

International Search Report and Written Opinion dated Feb. 27, 2006 from a corresponding PCT Application No. PCT/US2005/036116 (10 pages).

International Search Report with Written Opinion dated Jul. 26, 2006 from corresponding PCT Application No. PCT/US2006/005677.

Microsoft Windows 95, 1995, Microsoft Corporation, pp. 12 & 16.

John Scarne, Scarne's New Complete Guide to Gambling, 1974, Simon and Schuster, pp. 39-41.

Paul Yao, Microsoft Windows CE 2.0: It's Not Just for Handheld PCs Any More—MSJ, May 1998; www.microsoft.com/msj/0598/wince.aspx (pp. 1-23).

Mark Fischetti, Touch Screens: At Your Fingertips, Scientific American, Apr. 2001 (pp. 102-103).

Dan Bricklin, About Tablet Computing Old and New, Nov. 22, 2002; http://www.bricklin.com/tabletcomputing.htm (pp. 1-7).

Final Office Action from U.S. Appl. No. 11/064,217, dated Jan. 29, 2009.

Office Action dated Mar. 31, 2009 from U.S. Appl. No. 11/372,549.

First Office Action dated Mar. 20, 2009 from Chinese Patent Application No. 2006800056890.

Office Action dated Nov. 19, 2009 from U.S. Appl. No. 11/064,217.

Second Office Action dated Sep. 11, 2009 from Chinese Patent Application No. 2006800056890.

Examination Report dated Apr. 13, 2010 for Australian Patent Application No. 2005294254.

Office Action dated May 19, 2010 from U.S. Appl. No. 11/372,549.

Examiner Report dated Aug. 23, 2010 from Australian Patent Application No. 2006216910.

* cited by examiner

WIDE AREA PROGRESSIVE JACKPOT SYSTEM AND METHODS

FIELD OF THE INVENTION

The present invention relates to gaming machines, such as slot machines and video poker machines. More particularly, the present invention relates to methods and devices for awarding wide area progressive jackpots on gaming machines.

BACKGROUND OF THE INVENTION

Typically, utilizing a master gaming controller, a gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate game play. These steps require the gaming machine to control input devices, such as bill validators and coin acceptors, to accept money into the gaming machine and recognize user inputs from devices, including key pads, button pads, card readers, and ticket readers, to determine the wager amount, and initiate game play. After game play has been initiated, the gaming machine determines a game outcome, presents the game outcome to the player and may dispense an award of some type depending on the outcome of the game. The operations described above may be carried out on the gaming machine when the gaming machine is operating as a "stand alone" unit or linked in a network of some type to a group of gaming machines.

As technology in the gaming industry progresses, more and more gaming services are being provided to gaming machines via communication networks that link groups of gaming machines to a remote computer, such as a host server, that provides one or more gaming services. As an example, gaming services that may be provided by a remote computer to a gaming machine via a communication network of some type include player tracking, accounting, cashless award ticketing, lottery, progressive games, and bonus games or prizes. These services and features are provided in addition to the games that are available for play on the gaming machines.

The present invention is primarily directed to methods and devices for implementing progressive jackpot prize winning modes, referred to herein as "progressive systems." In a progressive system, a plurality of gaming machines are linked together. A percentage of game play on each gaming machine is used to determine a progressive jackpot value. The progressive jackpot value is typically determined by a central server in communication with each of the linked gaming machines. The central server updates the progressive jackpot value as it receives information regarding game play on the linked gaming machines and broadcasts this progressive jackpot value to the linked gaming machines.

The progressive jackpot value usually begins at some predefined value and continually increases until a win or a hit occurs at one of the linked gaming machines in the progressive system. After a win, the progressive jackpot is paid out at the machine showing the hit jackpot and the system resets to the pre-defined value and begins incrementing again. This procedure then repeats as jackpots are won and game play continues.

One type of progressive system links gaming machines spread out over many locations, such as gaming machines in stores, casinos and airports distributed throughout the state of Nevada. This type of system is typically referred to as a "wide area progressive" (WAP) system and a jackpot on this type of system is referred to as a wide area progressive (WAP) jackpot. A WAP system can link thousands of gaming machines and the WAP jackpot can reach values that are in the hundreds of thousands of dollars or millions of dollars.

In Nevada, there are many different WAP systems. The WAP systems are independent of one another such that a gaming machine is hooked to only one WAP system at any one time. Thus, a gaming machine hooked to a particular WAP system is allowed to provide only the progressive jackpots that are available on its system.

Progressive systems have proven to be popular with players of gaming machines and to increase levels of play, particularly when the progressive jackpot becomes large. However, a progressive jackpot, and in particular a wide area progressive jackpot, is typically associated with a particular game of chance, theme game denomination and network. On a gaming machine, to switch between wide area progressive jackpots, the gaming machine must be physically connected to a new network, programmed with new software and possibly physically altered to change the art work. This process is time consuming and a deterrent to offering progressive jackpot services desired by both casinos and players. It would be desirable to provide novel progressive systems and methods that address these and other limitations of the prior art.

SUMMARY OF THE INVENTION

The present invention provides a progressive system for allowing access to multiple wide area progressive jackpots at a gaming machine. The gaming machines connected to the progressive system can be switched between two or more different progressive games where each progressive game provides the chance to win a different wide area progressive jackpot. The gaming machines may be operable to dynamically connect to and to communicate with one or more different progressive systems. Switches can be triggered based upon a player input at the gaming machine or based upon a command received from a remote gaming device.

In another embodiment of the present invention, the gaming machine may be switched from a first game of chance to a second game of chance where the second game of chance provides a chance to win a wide area progressive jackpot. The switch from the first game of chance to the second game of chance may be triggered when a bonus event occurs during the first game of chance. In addition, the bonus event that triggers the switch may be accompanied by an award of bonus credits. These bonus credits may be used for wagers on the second game of chance and to fund the wide area progressive jackpot associated with the second game of chance.

A first aspect of the present invention provides a gaming machine for receiving a wager on a game chance. The gaming machine may be generally characterized as comprising: 1) a master gaming controller designed or configured a) to control the game of chance played on the gaming machine where an outcome for each game of chance is a wide area progressive jackpot, the wide area progressive jackpot a maximum award for the game of chance, and where a portion of each wager made on the gaming machine is contributed to the wide area progressive jackpot and b) to switch between a first game of chance including a first wide area progressive jackpot and a second game of chance including a second wide area progressive jackpot where the first game of chance and the second game of chance are each a type of the game of chance controlled by the master gaming controller; 2) a first display coupled to the master gaming controller for displaying an outcome to the game of chance; 3) an input mechanism for inputting one or more of cash, indicia of credit or combinations thereof for the wager; 4) an output mechanism for outputting one of more of cash, indicia of credit or combinations thereof; and 5) a network interface coupled to the master gaming controller for sending a message over a network regarding the portion of each wager contributed to the wide area progressive jackpot. The first display may be a plurality of slot reels or a video display. Further, the gaming machine may further comprise a second display for displaying one or more of an amount of the first wide area progressive jackpot, an amount of the second wide area progressive jackpot or combinations thereof.

In particular embodiments, the wager amount may be variable for each game of chance. Further, an award of the wide area progressive jackpot may be enabled when the wager amount on each game of chance is above or equal to a threshold wager amount or the wide area progressive jackpot may be disabled when the wager on each game of chance is below the threshold amount. The threshold wager amount may be a maximum wager amount for the game of chance or the threshold wager amount may be a minimum wager amount for the game of chance.

In other embodiments, a probability of winning the wide area progressive jackpot may be variable where the probability may be varied as one or more of a function of an amount contributed to the wide area progressive jackpot, an amount wagered on the game of chance or combinations thereof. Further, a probability of winning the first wide area progressive jackpot may be different from the probability of winning the second wide area progressive jackpot. In addition, an amount of the first wide area progressive jackpot may be different from the amount of the second wide area progressive jackpot.

In yet other embodiments, a denomination for each game of chance may be variable. Also, a denomination of the first wide area progressive jackpot may be different from the denomination of the second wide area progressive jackpot. Further, an amount contributed to the wide area progressive jackpot may be variable as a function of an amount wagered on the game of chance.

In particular embodiments, a portion of the wide area progressive jackpot, which is less than the maximum award, may be awarded when the wager on the game of chance is less than a threshold wager amount. The portion may be a percentage of the maximum award and may be variable. The portion may be variable as a function of a wager amount on the game of chance.

In other embodiments, after a switch from the first game of chance to the second game of chance, one or more of a theme, graphics, sounds, a paytable, game software, or combinations thereof that are used to generate the game of chance may be changed on the gaming machine. The one or more of a graphics, sounds, a paytable, game software or combinations thereof may be downloaded from a remote gaming device. Further, all or a portion of the game of chance presented on the first display may be generated on a remote gaming device. In addition, the master gaming controller may be operable to receive a video stream of a presentation for the game chance from a remote gaming device and to display the video stream on the gaming machine.

In other embodiments, the master gaming controller may be further designed or configured to 1) establish a communication session with a remote gaming device that polls the gaming machine for contributions to the wide area progressive jackpot, 2) receive updates of an amount of the first wide area progressive jackpot from a first remote gaming device and to receive updates of an amount of the second wide area progressive jackpot from a second remote gaming device. The first remote gaming device and the second remote gaming device may be the same gaming device.

After a switch from the first game of chance to the second game of chance, the master gaming controller may be further designed or configured to terminate a first communication session with a first remote gaming device that polls the gaming machine for contributions to the first wide area progressive jackpot and to establish a second communication session with a second remote gaming device that polls the gaming machine for contributions to the second wide area progressive jackpot. In yet other embodiments, a switch from the first game of chance to the second game of chance may be triggered from an event generated at one or more of the gaming machine, a remote gaming device or combinations thereof. Also, a switch from the first game of chance to the second game of chance may be triggered as a result of a player input at the gaming machine.

In yet other embodiments, the gaming machine may be operable to display a plurality of wide area progressive jackpots available for play on the gaming machine and to receive an input for selecting one of the plurality of wide area progressive jackpots available for play. The display of the plurality of wide area progressive jackpots or the input for selecting one of the plurality of wide area progressive jackpots may be made via a player tracking unit coupled to the gaming machine. The first display may be a video display and the plurality of wide area progressive jackpots available for play on the gaming machine may be displayed on the video display.

In yet other embodiments, the first display may be a touch screen enabled video display and the plurality of wide area progressive jackpots available for play may be displayed on the touch screen enabled video display. The input for selecting one of the plurality of wide area progressive jackpots may be made via the touch screen enabled video display. In addition, the gaming machine may further comprise 1) a second display different from the first display where the plurality of wide area progressive jackpots available for play are displayed on the second display or 2) one or more mechanical input buttons or touch screen input buttons where an input for selecting one of the plurality of wide area progressive jackpots available for play may be made via the one or more mechanical input buttons or touch screen input buttons. The display of the plurality of wide area progressive jackpots available for play on the gaming machine may include information regarding each of the wide area progressive jackpots. The displayed information may include one or more of a jackpot amount for each of the wide area progressive jackpots, a denomination for each of the wide area progressive jackpots, a minimum wager required for each of the wide area progressive jackpots, a theme associated with each of the wide area progressive jackpots, a payout schedule associated with each of the wide area progressive jackpots, a demo game associated with each of the wide area progressive jackpots or combinations thereof.

In other embodiments, the gaming machine may be further designed or configured to 1) generate a message including information regarding an amount contributed to the wide area progressive jackpot where the message further includes routing information that allows the message to be routed to one of plurality remote gaming devices that each provide a different wide area progressive jackpot, 2) to switch from a first paytable to a second paytable where the paytables are not dynamically generated and are pre-approved for use on the gaming machine prior to the switch or 3) to control concurrently and to present concurrently the first game of chance and a third game of chance with a third wide area progressive jackpot. The first game of chance may be presented on the first display and the third game of chance may be presented on a second display or the first game of chance may be presented on a first portion of the first display and the third game of chance may be presented on a second portion of the first display. The master gaming controller may be further designed or configured to switch between the third game of chance including the third wide area progressive jackpot and the second game of chance including the second wide area progressive jackpot. The games of chance (e.g., the first, second and third games of chance) may be selected from the group consisting of a bingo game, a centrally determined game, a card game, a slot game, a dice game, a poker game, a pachinko games, a multiple hand poker game, a pai-gow poker game, a black jack games, a keno game, a roulette game, a craps game, checkers and a board game.

In particular embodiments, the gaming machine may further comprise: a first input mechanism for receiving input from one or more of an RFID tag, a cell phone, a magnetic striped card, a smart card, a printed voucher and a hand-held computer. The input mechanism may be selected from the group consisting of a bill validator, a card reader, a printed voucher acceptor, a coin acceptor and a RFID tag reader. The output mechanism may be selected from the group consisting of a coin hopper, a voucher printer, RFID tag programmer and a card reader. Further, the input mechanism may be designed or configured to receive an electronic funds transfer of cash or indicia of credit or the output mechanism may be designed or configured to output an electronic funds transfer of cash or indicia of credit for storage on a remote gaming device.

Another aspect of the present invention provides a gaming machine for receiving a wager on a game chance. The gaming machine may be generally characterized as comprising: 1) a master gaming controller designed or configured a) to control the game of chance played on the gaming machine and b) to switch between a first operational mode and a second operational mode wherein, in the first operational mode, the game of chance includes a chance to win a wide area progressive jackpot, the wide area progressive jackpot a maximum award for the game of chance, and where a portion of each wager made on the gaming machine while it is in the first operational mode is contributed to the wide area progressive jackpot and where in the second operational mode the game of chance does not include the chance to win the wide area progressive jackpot and the gaming machine does not contribute to the wide area progressive jackpot; 2) a first display coupled to the master gaming controller for displaying an outcome to the game of chance; 3) an input mechanism for inputting one or more of cash, indicia of credit or combinations thereof for the wager; 4) an output mechanism for outputting one of more of cash, indicia of credit or combinations thereof; and 5) a network interface coupled to the master gaming controller for sending a message over a network regarding the portion of each wager contributed to the wide area progressive jackpot when the gaming machine is in the first operational mode.

In particular embodiments, a switch between the first operational mode and the second operational mode may be triggered from an event generated at one of the gaming machine, a remote gaming device or combinations thereof. Also, a switch from the first operational mode to the second operational mode may be triggered as a result of a player input at the gaming machine. The game of chance may be selected from the group consisting of a bingo game, a centrally determined game, a card game, a slot game, a dice game, a poker game, a pachinko games, a multiple hand poker game, a pai-gow poker game, a black jack games, a keno game, a roulette game, a craps game, checkers and a board game.

The master gaming controller may be further designed or configured to establish a communication session with a remote gaming device that allows the gaming machine to notify the remote gaming device of its contributions to the wide area progressive jackpot when the gaming machine is initialized in the first operational mode or when the gaming machine is switched from the second operational mode to the first operational mode. The remote gaming device may poll the gaming machine for its contributions to the remote gaming device. Further, the master gaming controller may be further designed or configured to terminate a communication session with a remote gaming device that determines an amount of the wide area progressive jackpot and that receives information from the gaming machine indicating its contributions to the wide area progressive jackpot when the gaming machine is switched from the first operational mode to the second operational mode.

In further embodiments, after a switch between the first operational mode and the second operational mode, one or more of a theme, graphics, sounds, a paytable, game software, or combinations thereof that are used to generate the game of chance may be changed on the gaming machine. Also, the master gaming controller may be further designed or configured to switch from a first paytable to a second paytable wherein the paytables are not dynamically generated and are pre-approved for use on the gaming machine prior to the switch. The one or more of a graphics, sounds, a paytable, game software or combinations thereof may be downloaded from a remote gaming device. Further, all or a portion of the game of chance presented on the first display may be generated on a remote gaming device. In addition, the master gaming controller may be operable to receive a video stream of a presentation for the game chance from a remote gaming device and display the video stream on the gaming machine.

In yet other embodiments, the gaming machine may be operable to display a plurality of different types of games of chance available for play on the gaming machine where a portion of the plurality of different types of games of chance include the chance to win the wide area progressive jackpot and to receive an input for selecting one of the plurality of different types of games of chance. The input for selecting one of the plurality of different types of games of chance may trigger a switch between the first operational mode and the second operational mode. The display of the plurality of different types of games of chance available for play or the input for selecting one of the plurality of different types of games of chance may be made via a player tracking unit coupled to the gaming machine.

In particular embodiments, the first display may be a video display and the plurality of different types of games of chance available for play may be displayed on the video display. Also, the first display may be a plurality of slot reels. In addition, the first display may be a touch screen enabled video display and the plurality of different types of games of chance available for play may be displayed on the touch screen enabled video display and the input for selecting one of the plurality of different types of games of chance may be made via the touch screen enabled video display. The gaming machine may further comprise 1) a second display different from said first display where the plurality of different types of games of chance available for play are displayed on the second display or 2) one or more mechanical input buttons or touch screen input buttons where the input for selecting the one of the plurality of different types of games of chance available for play may be made via the one or more mechanical input buttons or the touch screen input buttons.

In particular embodiments, the gaming machine may further comprise: a first input mechanism for receiving input from one or more of an RFID tag, a cell phone, a magnetic striped card, a smart card, a printed voucher and a hand-held computer. In addition, the input mechanism may be selected from the group consisting of a bill validator, a card reader, a printed voucher acceptor, a coin acceptor and a RFID tag reader. The output mechanism may be selected from the group consisting of a coin hopper, a printer, a RFID tag programmer and a card writer. Also, the input mechanism may be designed or configured to receive an electronic funds transfer of cash or indicia of credit and the output mechanism may be designed or configured to output an electronic funds transfer of cash or indicia of credit for storage on a remote gaming device.

In other embodiments, the master gaming controller may be designed or configured to instantiate and control two or more game play interfaces wherein separate wagers are received for each game of chance played in each game play interface where each game of chance played in each game play interface is generated independently and played independently. When two or more game play interfaces are simultaneously instantiated, two or more games of chance may be played concurrently on the gaming machine. Further, each of the game play interfaces may be operated in the first operational mode or the second operational mode. In addition, each of the game play interfaces may be switched between the first operational mode and the second operational mode. In particular, the first display may be a video display and each instantiation of the game play interfaces may use a portion of the video display.

In yet other embodiments, the gaming machine may further comprise a second display for displaying an amount of the wide area progressive jackpot or an amount of the wide area progressive jackpot may be displayed on the first display. The master gaming controller is gaming machine is operable to receive messages indicating an amount of the wide area progressive jackpot and display the amount of the wide area progressive jackpot. When the gaming machine is in the first operational mode, the master gaming controller may be further designed or configured to switch between a first game of chance including a first wide area progressive jackpot and a second game of chance including a second wide area progressive jackpot. Also, the master gaming controller may be further designed or configured to direct a first contribution to the first wide area progressive jackpot when the wager is made on the first game of chance and to direct a second contribution to the second wide area progressive jackpot when the wager is made on the second game of chance. Further, the master gaming controller may be further designed or configured to receive updates of an amount of the first wide area progressive jackpot from a first remote gaming device and to receive updates of an amount of the second wide area progressive jackpot from a second remote gaming device. The first remote gaming device and the second remote gaming device may be the same remote gaming device.

Yet another aspect of the present invention provides a gaming machine for playing a game chance. The gaming machine may be generally characterized as comprising 1) a master gaming controller designed or configured a) to control the game of chance played on the gaming machine, the game of chance comprising: a first game of chance and second game of chance, b) to switch from the first game of chance to the second game of chance when a first event occurs during a play of the first game of chance, c) to switch between the second game of chance to the first game of chance when a second event occurs during the play of the second game of chance where the play of the second game of chance includes a chance to win a wide area progressive jackpot, the wide area progressive jackpot a maximum award for the second game of chance, and where the gaming machine at least contributes to the wide area progressive jackpot when the second game of chance is played; and d) to receive a first wager on the first game of chance; 2) a first display coupled to the master gaming controller for displaying an outcome to the game of chance; 3) an input mechanism for inputting one or more of cash, indicia of credit or combinations thereof for the first wager; 4) an output mechanism for outputting one of more of cash, indicia of credit or combinations thereof; and 5) a network interface coupled to the master gaming controller for sending a message over a network regarding an amount contributed to the wide area progressive jackpot when the second game of chance is played. The first game of chance or the second game of chance may be selected from the group consisting of a bingo game, a centrally determined game, a card game, a slot game, a dice game, a poker game, a pachinko games, a multiple hand poker game, a pai-gow poker game, a black jack games, a keno game, a roulette game, a craps game, checkers and a board game. The first game of chance may not include a progressive jackpot award.

In particular embodiments, the first event may be a random bonus event determined from a paytable for the first game of chance. The paytable may include chances to trigger a plurality of different random bonus events. An award of bonus credits may accompany the random bonus event and bonus credits may be available for making a second wager on the second game of chance. Further, the second wager may be made only using the bonus credits. In particular, the second event may occur when an amount of bonus credits falls below or is equal to a threshold value where the threshold value may be zero. Also, the second event may be a request by a player to return to the first game of chance.

In other embodiments, the bonus credits may be cashed out as payout from the gaming machine. In addition, the bonus credits may be non-cashable such that they can only be used to play the second game of chance. Further, the bonus credits may be cashable as a payout from the gaming machine for less than face value. Also, the gaming machine may be operable to receive an input of cash or indicia of credit to increase the bonus credits.

In yet other embodiments, a payout schedule for the second game of chance may include the wide area progressive jackpot and a plurality of credit payouts less than the wide area progressive jackpot. The credit payouts may be available for making a second wager on the second game of chance or the credit payouts may not be available for making a second wager on the second game of chance. Further, the credit payouts may be available for making the first wager. Also, one or more of the credit payouts may only be available for making a second wager on the second game of chance.

In particular embodiments, the gaming machine may further comprise: a first input mechanism for receiving input from one or more of an RFID tag, a cell phone, a magnetic striped card, a smart card, a printed voucher and a hand-held computer. In addition, the input mechanism may be selected from the group consisting of a bill validator, a card reader, a printed voucher acceptor, a coin acceptor and a RFID tag reader. The output mechanism may be selected from the group consisting of a coin hopper, a printer, a RFID tag programmer and a card writer. Also, the input mechanism may be designed or configured to receive an electronic funds transfer of cash or indicia of credit and the output mechanism may be designed or configured to output an electronic funds transfer of cash or indicia of credit for storage on a remote gaming device.

In further embodiments, the master gaming controller may further designed or configured to establish a communication session with a remote gaming device that allows the gaming machine to notify the remote gaming device of its contributions to the wide area progressive jackpot when second game of chance is played. The remote gaming device may poll the gaming machine for its contributions to the remote gaming device. The master gaming controller may further be designed or be configured to terminate a communication session with a remote gaming device that determines an amount of the wide area progressive jackpot and that receives information from the gaming machine indicating its contributions to the wide area progressive jackpot after the gaming machine is switched from the first game of chance to the second game of chance.

In other embodiments, after a switch between the first game of chance and the second game of chance, one or more of a theme, graphics, sounds, a paytable, game software, or combinations thereof that are changed on the gaming machine. The one or more of a graphics, sounds, a paytable, game software or combinations thereof may be downloaded from a remote gaming device. Further, all or a portion of the game of chance presented on the first display may be generated on a remote gaming device.

Yet other embodiments of the invention provide a network device for implementing a wide area progressive system. The network device includes a first interface for communicating with a central gaming system via a network and at least one interface for communicating with a plurality of gaming machines. The network device also includes at least one logic device configured to do the following: poll the plurality of gaming machines; obtain data from each gaming machine of the plurality of gaming machines regarding participation in a wide area progressive jackpot involving multiple gaming establishments; determine a recipient for the data and route the data to a central system that is implementing a particular wide area progressive jackpot.

At least one logic device may be further configured to qualify gaming machines and/or gaming establishments for participation in the progressive jackpot.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media.

These and other features of the present invention will be presented in more detail in the following detailed description of the invention and the associated figures.

BRIEF DESCRIPTION OF THE DRAWINGS

The invention may best be understood by reference to the following description taken in conjunction with the accompanying drawings, which are illustrative of specific embodiments of the present invention.

DESCRIPTION OF THE PREFERRED EMBODIMENTS

Figure 1:
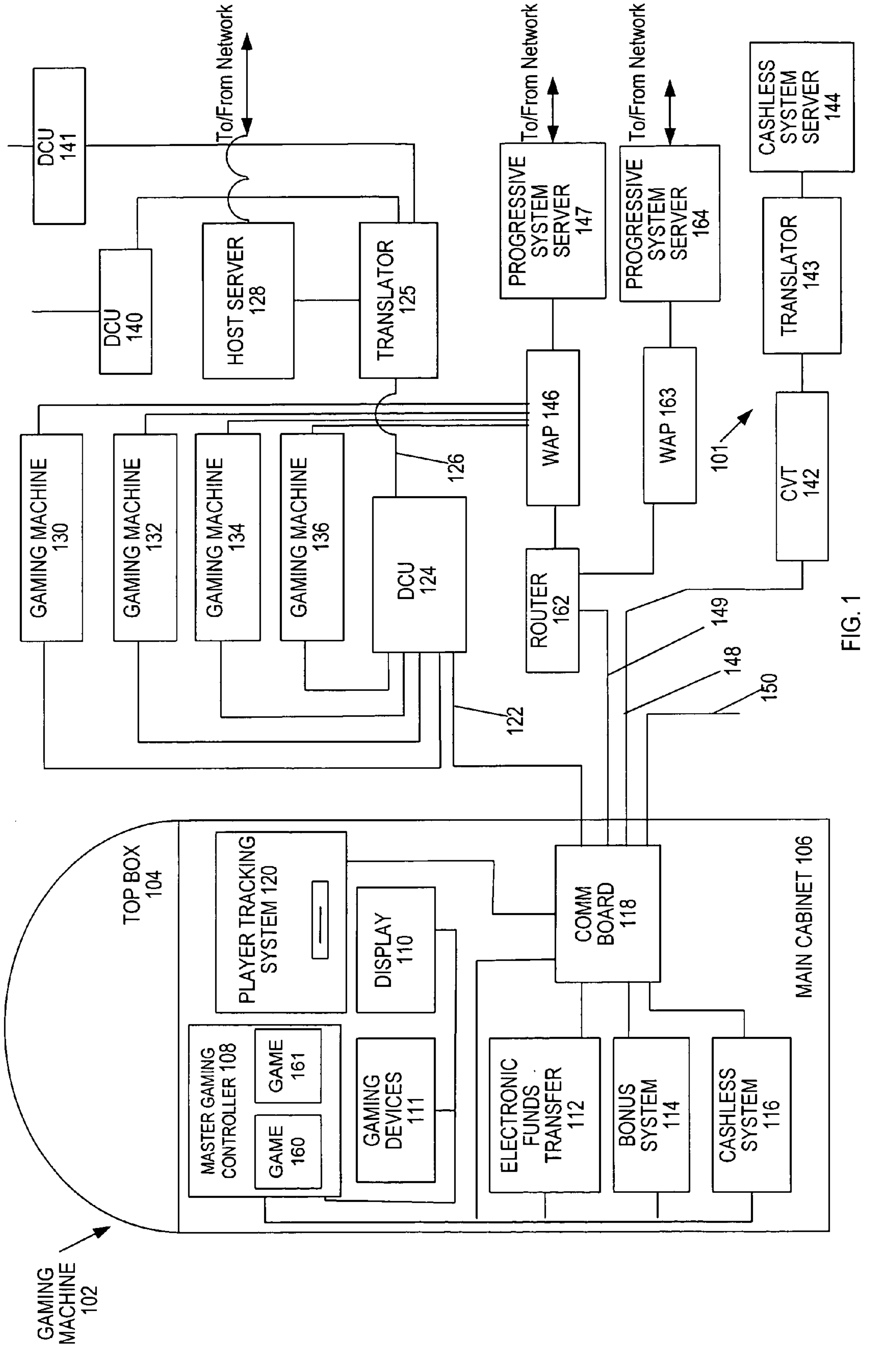
FIG. 1 is a block diagram depicting a network of gaming machines and other devices within a gaming establishment.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Moreover, numerous specific details are set forth below in order to provide a thorough understanding of the present invention. The present invention may be practiced without some or all of these specific details. In other instances, well known process operations have not been described in detail in order not to obscure the present invention.

Before describing features of the present invention, it is believed useful to describe features found in certain progressive gaming systems. Typically, a group of electronic gaming terminals is identified that will participate in a progressive game and these are coupled to a central computer, often via intermediate computers or other communication and/or control devices. The progressive game provides a chance to win a progressive jackpot, such as a wide area progressive jackpot. Typically, a particular theme, graphics, game logic, game denomination and paytable are associated with each progressive game.

A central computer stores information relating to, e.g., a prize base amount, percent of contribution from each coin (credit) used to increment the prize amount, the percent used to increment a reserve amount (for funding future prizes) and the like. The central system polls a cluster controller or other intermediate controller which responds with information about the number of coins played and/or the amount of contribution towards the progressive prize for all progressive-eligible gaming terminals coupled to that cluster controller. The central system computes the new prize and reserve amounts and broadcasts information to the cluster controllers for, e.g., displaying the prize amount to players. The cluster controllers also provide information to the central system when a particular gaming terminal has experienced a progressive prize hit or win. In the event of a progressive prize win, the central system contacts each cluster controller, gathering the last of the play to be included in the prize hit and coordinates the prize reset to begin another progressive game. Further details of progressive systems that may be used with present invention are described in U.S. Pat. No. 5,885,158, by Torango, et al., issued Mar. 23, 1999 and titled, "Gaming Systems for Multiple Progressive Games," which is incorporated herein by reference and for all purposes.

The present invention provides apparatus and methods for allowing access to multiple wide area progressive jackpots at a gaming machine. The gaming machines of the present invention may be switched between two or more different progressive games where each progressive game provides the chance to win a different wide area progressive jackpot. Thus, the gaming machines may be operable to dynamically connect to and communicate with one or more different progressive systems. Further, the gaming machines may be switched between a game of chance that provides a chance to win a progressive jackpot with a game of chance does not.

Many methods may be implemented to trigger a switch on the gaming machine. For instance, switches may be triggered based upon a player input at the gaming machine or based upon a command received from a remote gaming device. In another embodiment of the present invention, the gaming machine may be switched from a first game of chance to a second game of chance where the second game of chance provides a chance to win a wide area progressive jackpot. The switch from the first game of chance to the second game of chance may be triggered when a bonus event occurs during the first game of chance. In addition, the bonus event that triggers the switch may be accompanied by an award of bonus credits. These bonus credits may be used for wagers on the second game of chance and to fund the wide area progressive jackpot associated with the second game of chance.

FIG. 1 is a simplified block diagram depicting gaming machines within gaming establishment 101. The gaming machines are connected with a dedicated communication network via a host server and a data collection unit (DCU) according to one embodiment of the invention. According to some embodiments of the invention, the DCU is an enhanced DCU as described in U.S. patent application Ser. No. 10/187,059, entitled "Redundant Gaming Network Mediation," which is hereby incorporated by reference in its entirety.

In FIG. 1, gaming machine 102, and the other gaming machines 130, 132, 134, and 136, include a main cabinet 106 and a top box 104. The main cabinet 106 houses the main gaming elements and can also house peripheral systems, such as those that utilize dedicated gaming networks. The top box 104 may also be used to house these peripheral systems.

The master gaming controller 108 controls the game play on the gaming machine 102 and receives or sends data to various input/output devices 111 on the gaming machine 102. The master gaming controller 108 may also communicate with a display 110. The display 110 may be mechanical, such as a bank of slot reels, or a video display. The gaming machine 102 is not limited to a single display. Other examples of displays (not shown) that may be connected to the master gaming controller include a display for displaying an amount of a progressive jackpot or a secondary display, separate from display 110. When any of the displays are a video display, the displays may be equipped with a touch screen for providing input to the gaming machine 102.

An outcome to a game of chance may be displayed on the display 110. For example, a bingo game, a centrally determined game, a card game, a slot game, a dice game, a poker game, a pachinko games, a multiple hand poker game, a pai-gow poker game, a black jack games, a keno game, a roulette game, a craps game, checkers and a board game are examples of types of games of chance that may be displayed on the display 110. The gaming machine may be operable to present many different games of chance where a paytable, graphics, game logic, presentation logic, a denomination, a theme, sound, game software may vary from game to game. For example, the gaming machine may be adapted to present a first slot game with a first theme, first graphics, first sounds, first game software, a second slot game with a second theme, second graphics, second sounds, second game software and the same game logic as the first slot game or a video poker game with a third theme, third graphics, third graphics, third sounds, different game logic from the first slot game and the second slot game and different game software.

Typically, gaming machines may be designed to generate only a single type. For example, an EPROM storing game software for the single of type of game may be installed on the gaming machine. To change the game, the EPROM may have to be manually replaced on the gaming machine. Gaming machines of the present invention are not so limited.

In the present invention, the gaming machine 102 may be operable to present and/or generate a plurality of different types of games of chance. For example, the gaming machine may include an EPROM with game software for a plurality of games of chance for execution. In another embodiment, the master gaming controller may be operable to load different combination of software modules from a mass storage device, such as a CD-ROM or a hard-drive for execution to generate a game of chance. In yet another embodiment, the gaming machine may be operable to receive and store downloads of game software for execution to generate a game of chance from a remote gaming device. The downloads may include executable code, paytables, graphics, sounds or any other information used to generate the game of chance. In FIG. 1, two different types of games of chance 160 and 161 are shown residing on the gaming machine 102.

The plurality of games of chance presented on the gaming machine does not have to be solely generated on the gaming machine 102. A first portion of the plurality of games of chance may be generated on the gaming machine 102 and a first portion of the plurality of games of chance may be generated on a remote gaming device connected to the gaming machine 102. For example, a portion of the game of chance, such as an outcome to the game of chance may be generated on a remote gaming device, communicated to the gaming machine 102 and displayed on the gaming machine 102 under control of the master gaming control 108. In one embodiment, a multimedia presentation for a game of chance may be generated on a remote gaming device and streamed to the gaming machine 102 via video streaming techniques known in the art. The host server 128, the progressive system servers 147 and 164, the cashless system server 144 and the gaming machines 130, 132, 134 and 136 are examples of remote gaming devices that may be used to generate all of or portion of the game of chance played on gaming machine 102 or to download game software to the gaming machine.

The gaming machine 102 may be used to generate a plurality of different progressive games that provide a chance to win a progressive jackpot. In particular embodiments, the progressive games may be wide area progressive games that are characterized by a large jackpot and a low probability of winning the jackpot. Each of the progressive games may include its own paytable, denomination, theme, graphics, sounds, game logic, presentation logic and game software.

The jackpots for the progressive games may be generated on a remote gaming device. For example, via communication path 149, the gaming machine 102 may be connected to a wide area progressive (WAP) device 146 or WAP device 163. The WAP 146 is connected to a progressive system server 147. The WAP 163 is connected to the progressive system server 164. The progressive system servers 147 and 164 may be used to provide progressive gaming services to the gaming machines. In one embodiment, the progressive system servers may each provide a separate wide area progressive jackpot. Further details of these devices are described with respect to FIG. 4.

The progressive game services enabled by the progressive game network increase the game playing capabilities of a particular gaming machine by enabling a larger jackpot than would be possible if the gaming machine was operating in a "stand alone" mode. Playing a game on a participating gaming machine gives a player a chance to win the progressive jackpot. The rate at which the jackpot grows increases as the number of gaming machines connected in the progressive network is increased. The size of the jackpot tends to increase game play on gaming machines offering a progressive jackpot.

In one embodiment of the present invention a portion of each wager on a game of chance played on gaming machine 102 is contributed to a wide area progressive jackpot. The gaming machine is operable to switch between a plurality of games of chance that offer a chance to win different wide area progressive jackpots. These types of games are referred to as "progressive games." Depending on the game of chance that is enabled on the gaming machine at a particular time, a portion of the wager may be contributed to a different wide area progressive jackpot pool. The switch between the different progressive games of chance may be triggered as a result of one or more of inputs made on the gaming machine, inputs received from a remote gaming device, logic residing on the gaming machine, logic residing on a remote gaming device or combinations thereof. Further, details of an interface for initiating a switch on the gaming machine are described with respect to FIGS. 2A and 2B.

As an example, game 160 may be a first progressive game with a chance to win a first wide area progressive jackpot and game 161 may be a second progressive game with a chance to win the second wide area progressive jackpot. The first wide area progressive jackpot and the second wide area progressive jackpot may be maximum awards, respectively for games 160 and 161. An amount of the first wide area progressive jackpot and an amount of the second wide area progressive jackpot game may differ from one another. Further, the probability of winning the first wide area progressive jackpot or the second wide area progressive jackpot may be different. In addition, a denomination for the first progressive game providing a chance to win the first wide area progressive game may be different than the denomination for the second progressive game providing the chance to win the second wide area progressive jackpot.

In one embodiment, an amount of the first wide area progressive jackpot may be maintained by progressive system server 147 and an amount of the second wide area progressive jackpot may be maintained by progressive system server 164. In the present invention, a single progressive system server may maintain multiple wide area progressive jackpots. Thus, in another embodiment, the progressive system server 147 (or the progressive system server 164) may maintain both the first wide area progressive jackpot and the second wide area progressive jackpot.

The gaming machine 102 may be designed to display progressive jackpot amounts for each of the progressive games available for display on the gaming machine. For example, the gaming machine 102 may receive updates of a first progressive jackpot amount from the progressive system server 147 and a second progressive jackpot amount from the progressive system server 164. The progressive jackpot amounts may be displayed serially or concurrently with information describing the progressive game with which it is associated. The progressive jackpot amounts may be displayed on display 110, a display associated with the player tracking system 120 or other displays (not shown) coupled to the gaming machine 102. The progressive jackpot amounts may also be displayed on display nearby the gaming machine 102.

Traditionally, to add a gaming machine to a wide area progressive network, the gaming machine has been fitted with special communication hardware and then physically linked to a private network. Then, at the server, information regarding the gaming machine is manually entered into the server by an operator so that the progressive server will recognize information from the newly added gaming machine and be able to poll the gaming machine for its contribution to the wide area progressive jackpot. Multiple wide area progressive jackpots have been implemented on different progressive systems. However, the gaming machines are connected to only one progressive system at a time and only provide a chance to win the wide area progressive jackpot on the progressive system to which it is connected. The present invention is not so limited.

In the present invention, a first set of linked gaming machines may contribute to the first wide area progressive jackpot and a second set of gaming machines may contribute to the second wide area progressive jackpot. The first set of linked gaming machines and the second set of linked gaming machine may include gaming machines in common. For instance, gaming machines 102 and 130 may both contribute at different times to the first wide area progressive jackpot and the second wide area progressive jackpot while gaming machines 132 and 134 may contribute exclusively to the first wide area progressive jackpot while gaming machine 136 may contribute exclusively to the second wide area progressive jackpot.

In addition, gaming machines may be dynamically added or removed from each progressive system without manual intervention by an operator. For example, at a first time, gaming machine 102 may be adapted for playing the first progressive game with a chance to win the first wide area progressive jackpot (e.g., game 160), then a player playing a game on gaming machine 102 may input a request at the gaming machine to play the second progressive game with a chance to win the second wide area progressive jackpot (see FIGS. 2A and 2B). The player may request the switch because something about the second progressive game is more appealing to the player. For instance, the second progressive game could have a higher jackpot than the first progressive game, graphics, sounds or a theme that are more appealing to the player, a denomination that is preferred by the player or the player may simply wish to try their chances at winning a number of different wide area progressive jackpots.

After the switch on gaming machine 102 from the first progressive game to the second progressive game, the gaming machine may have to load and/or execute gaming software that allows the second progressive game to be played on the gaming machine. Then, in one embodiment, a polling session on the first progressive system maintaining the first wide area progressive jackpot may be terminated and a polling session with the second progressive system maintaining the second wide area progressive jackpot may be initiated. The termination procedure may involve the gaming machine 102 sending a message notifying the first progressive system that it has switched games and will no longer be contributing to the first wide area progressive jackpot. After receiving this message, the first progressive system may remove the gaming machine 102 from a list of gaming machines that it is actively polling and cease polling the machine.

The initiation procedure may involve the gaming machine 102 sending a message with a request to the second progressive system server requesting to join the second wide area progressive game. The second progressive system may perform an authentication procedure before allowing the gaming machine 102 to join the second wide area progressive game. For example, the second progressive system server may include a list of gaming machines and associated identification information for each gaming machine that is allowed to join in the second progressive game. The gaming machine 102 and second progressive system server may exchange information, such as one or more messages. The messages may be used to allow the second progressive system server to accept gaming machine 102 into the second progressive game (i.e., log into the second progressive network) and to allow a game played on the gaming machine 102 to be eligible for a chance to win the second wide area progressive jackpot.

Once gaming machine 102 has been accepted by the second progressive system, then the second progressive system may add the gaming machine 102 to a list of gaming machines that is polls for contributions to the second progressive wide area progressive jackpot and the gaming machine may be marked as eligible to win the second wide area progressive jackpot. Then, the second progressive system may start polling the gaming machine 102 for contributions. If for some reason, the gaming machine 102 is not allowed to join the second progressive game, then the second progressive system may send a message to the gaming machine notifying it is not eligible to join the second progressive game. After the gaming machine receives this message, it may terminate the switch and notify the player that the second progressive game is not available for play on the gaming machine 102.

In general, the present invention is not limited to the serial polling scheme described above, i.e., the gaming machine 102 is polled by one progressive system server at any one time. In another embodiment, the gaming machine 102 may be connected to multiple progressive systems at the same time and receive polls from each progressive system. The gaming machine 102 may connect to a plurality of progressive systems when it is first initialized on the network 149. Depending on what game is being played on the gaming machine or what combination of games is being played on the gaming machine 102, the gaming machine will notify each progressive system of its status.

The progressive systems, such as 147 and 164, may provide information to identify themselves to the gaming machine in their polling messages and ask for the gaming machine's status as well as any contributions to the progressive jackpots provided by each of the progressive systems. The gaming machine may compare this information with its current configuration to determine what information to report to the progressive systems. For example, after receiving a poll from a first progressive system, the gaming machine 102 may notify a first progressive system of its status, such that it is currently configured to play one of the progressive games support by the first progressive system, an amount of its contribution to the wide area progressive jackpot provide by the first progressive system or that it is idle. Thus, the first progressive system may mark the gaming machine 102 as eligible to receive the first wide area progressive jackpot and continue to poll the gaming machine 102 for its status and contribution amount.

In another example, after receiving a poll from a second progressive system server, 164, providing the second wide area progressive jackpot, the gaming machine 102 may notify the second progressive system that it is not currently configured to provide any progressive games supported by the server 164. The server 164 may continue to poll the gaming machine for its status. However, the server 164 may mark the gaming machine as ineligible to win any awards on the progressive system until it learns of a change in the status of gaming machine 102 that indicates it is currently configured to contribute to progressive awards maintained by the server 164.

In yet another embodiment, a polling procedure does not have to be employed. For example, each time a switch is triggered that allows the gaming machine to play a particular progressive game, the gaming machine may notify the progressive system server supporting the particular progressive game of its status. The progressive system server may send a reply message to the gaming machine confirming its status. Then, each time the gaming machine determines that it has a contribution to make to a progressive jackpot and in particular a wide area progressive jackpot, the gaming machine may address a message to the appropriate progressive server and send the message.

The router 162 may be used to route messages indicating contributions and eligibility status to different progressive servers, such as progressive system server 147 or progressive system server 164. In one embodiment, WAP 146 or WAP 163 may act as a router. In another embodiment, one of the gaming machines, such as 102, 130, 132, 134 and 136 may act as a router. The router 162 may also be used in a polling scheme to route messages between different gaming machines and different progressive servers.

In general, the functions of different devices shown in FIG. 1 may be combined or separated as is warranted by a particular gaming environment. For example, a gaming machine may provide functions of one or more of a router 162, WAP 146, DCU 140, a host server 128, a translator 125 or a CVT 142 in some instances. In another example, a progressive system server, such as 147, may also provide player tracking services and cashless services.

In a second aspect of the present invention, the gaming machine 102 may be adapted to switch between two operational modes. A first operational mode where the game of chance on the gaming machine does not provide a chance to win a progressive jackpot and a second operational mode where the game of chance does provide a chance to win a progressive jackpot. In the first operational mode, the gaming machine 102 may not be linked to a progressive system. In the second operational mode, the gaming machine may be connected to a progressive system in a manner described above when the gaming machine switches between a first progressive game and a second progressive (e.g., after a switch the between the first operational mode and the second operational mode, the gaming machine 102 may terminate or initiate a communication session with a progressive system server, such as 147 or 164).

As an example, game 160 may be a game of chance without a chance to win a progressive jackpot. When the gaming machine is configured to play game 160, the gaming machine may operate in a "stand alone" mode. Game 161 may be a progressive game with a chance to win a first progressive jackpot. When the gaming machine is configured to play the second game 161, the gaming machine 102 may operate in a "linked progressive" mode where it is connected to a wide area progressive system and portion of wagers from the second game may be contributed to a progressive jackpot and in particular to a wide area progressive jackpot.

Thus, one aspect of the switch between the first operational mode and the second operational mode may involve switching the gaming machine from the stand-alone mode to the linked progressive mode, which may involve changing the communication scheme on the gaming machine as has been described above in regards to switching between progressive games. Another aspect of the switch between the first operational mode and the second operational mode may include switching one or more of graphics, sounds, a theme, executable code, communications software, paytable and any other gaming elements needed to generate the game of chance in the first operational mode or the second operational mode. To provide a switch between the first operational mode and the second operational mode, the gaming machine may download the graphics, sounds, executable code, communications software and paytable from a remote gaming device, such as but not limited to another gaming machine, the router 162, WAP 146 or 163, host server 128, progressive system server 164, cashless system server 144, etc.

Figure 2A:
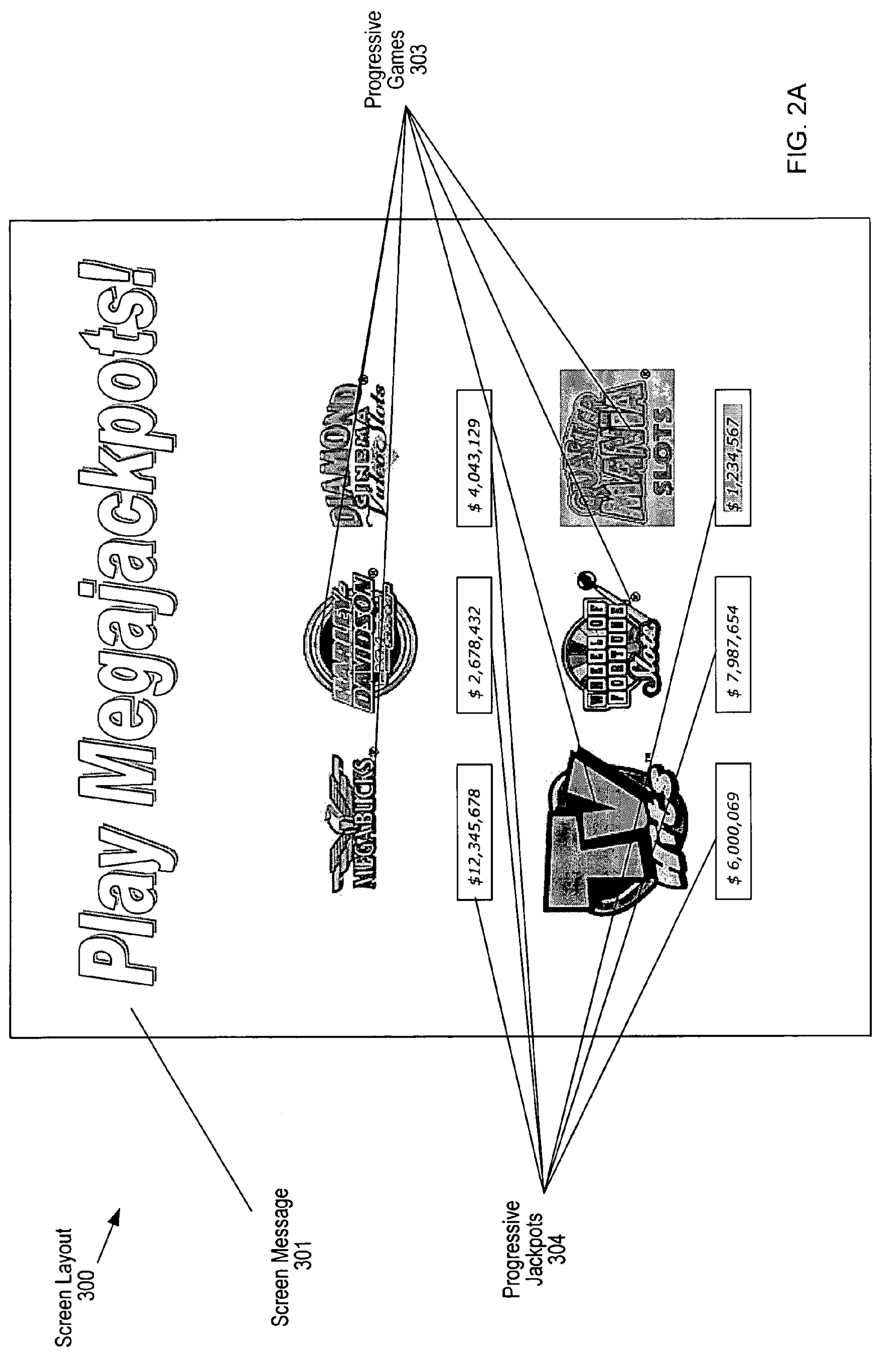
FIGS. 2A and 2B show two screen layouts providing different game selections available on a gaming machine.
Figure 2B:
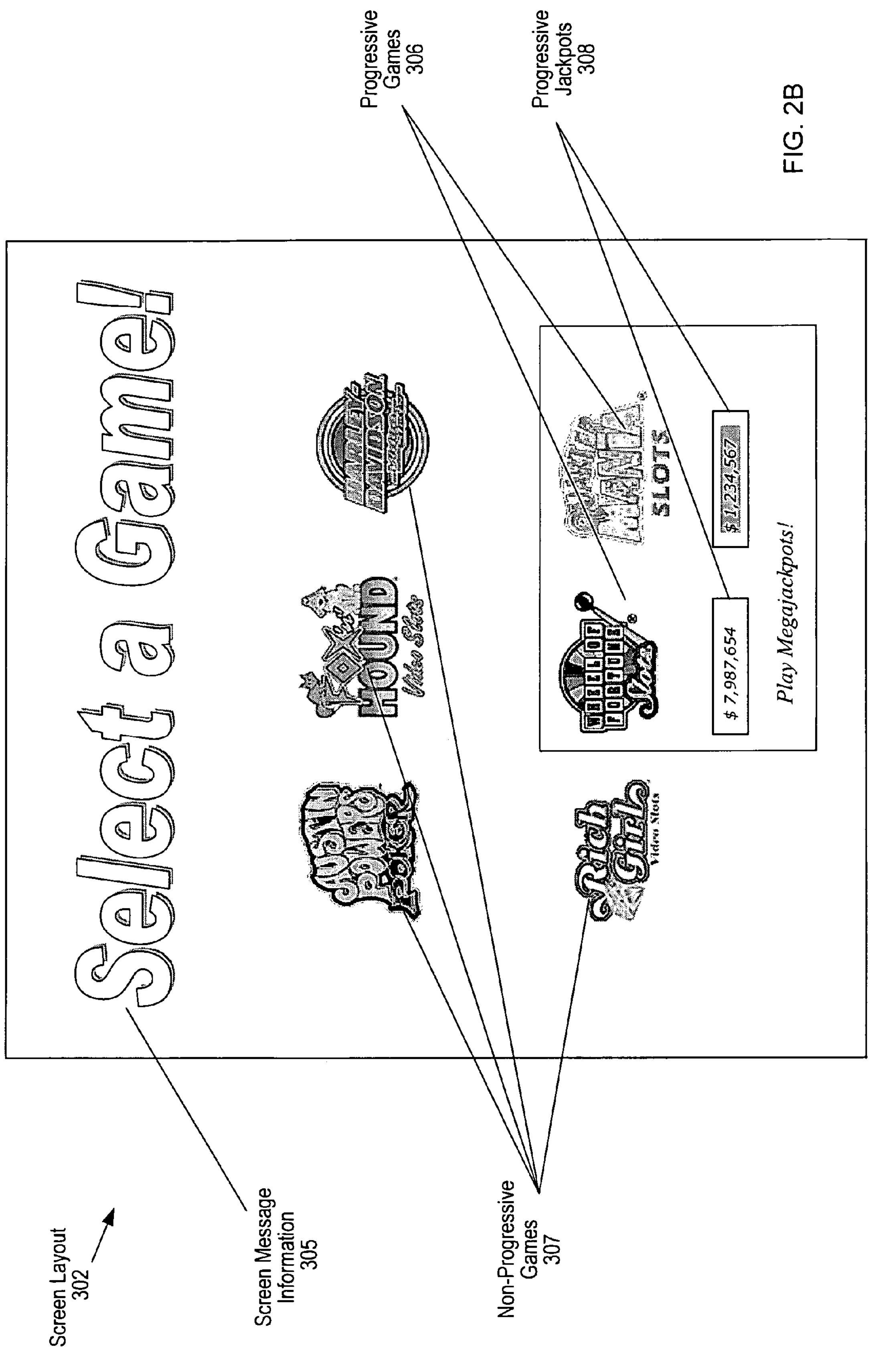

The gaming machine 102 may display a plurality of games of chance including progressive games or non-progressive games that are available for play on the gaming machine (see FIG. 2B). For the progressive games, progressive jackpot amounts including an amount of a wide area progressive jackpot may be displayed for each progressive game available for play and these progressive jackpot amounts may be updated regularly. The gaming machine may receive updates of these jackpot amounts from various progressive system servers, such as server 147 and server 164. A player may use the progressive jackpot amounts as a selection criterion in choosing a game of chance to play at the gaming machine.

The present invention is not limited to switching between a first operational mode providing a non-progressive game of chance and a second operational mode providing a progressive game of chance. The gaming machine 102 may provide access to multiple progressive games of chance. Thus, when the gaming machine 102 is operating in the second operational mode, the gaming machine 102 may be switched from a first progressive game to a second progressive as has been previously described above.

In yet another aspect of the present invention, the master gaming controller 108 may be designed to control a first game of chance where when a first event occurs during the first game of chance, the gaming machine is switched to a second game of chance where the second game of chance provides a chance to win a wide area progressive jackpot. In a particular embodiment, the first game of chance does not provide a chance to win a wide area progressive jackpot while the second game of chance provides a chance to win the wide area progressive jackpot. Thus, in this embodiment, the gaming machine may be switched from a "stand alone" operational mode to a "linked progressive mode," i.e., the first and second operational mode that was described above.

In another embodiment, the first game of chance may provide a chance to win a local progressive jackpot or a first wide area progressive jackpot and the second game of chance may provide a chance to win a second wide area progressive jackpot. This switch may require connections do different progressive systems as was previously described. For example, the local progressive jackpot or the first wide area progressive jackpot may be much smaller than the second wide area progressive jackpot. Thus, the switch from the local progressive jackpot or the first wide area progressive jackpot to the second wide area progressive jackpot may provide excitement to the player.

The first event that triggers the switch from the first game of chance to the second game of chance may be a bonus event on the gaming machine. The first game of chance may provide a number of different bonus outcomes that lead to a switch to the second game of chance. The probability of each bonus outcome occurring that leads to the switch to the second game of chance may be defined in a paytable for the first game of chance. For instance, in a slot game the bonus outcomes may be defined as different combinations of symbols occurring. In particular embodiments, the bonus outcomes may lead to different progressive games with different wide area progressive jackpots. Other events that may trigger or affect the switch from the first game of chance to the second game of chance include but are not limited to a time of day, a day of the week, a player input and a random trigger generated on the gaming machine or a remote gaming device independent of the first game of chance. Further details of providing a second game of chance as a bonus outcome to a first game of chance are described with respect to FIGS. 3A-3D.

In one embodiment of the present invention, an award of bonus credits may accompany a bonus outcome. The bonus credits may be used for a wager on the second game of chance and a portion of this wager may be used to fund a wide area progressive jackpot associated with the second game of chance. The amount of the award may be varied allowing the player to play the second game of chance a varying amount of times. In another embodiment, the player may be allowed to play the second game of chance one or more times (e.g., three pulls on at a slot game when the second game of chance is a slot game) and the player may not be required to make a wager on the second game of chance.

In some embodiments, the bonus credits may be non-cashable in that the bonus credits may only be used to play the second game of chance. In another embodiment, the credits may be cashable or transferable for play on the first game of chance. In yet another embodiment, the credits may be cashable for less than face value.

The second game of chance may include outcomes for a plurality of awards that are less than the maximum wide area progressive jackpot. As an example, all of the normal payouts for a traditional progressive game may be offered with the second game of chance. The maximum progressive jackpot award will always be cashable. The credits awarded for outcomes other than the progressive jackpot may be used for one or more of the following: to make additional wagers on the second game of chance, may be cashable, may be transferable for play on the first game of chance, may be non-cashable and usable only for wagers on the first game of chance or the second game of chance, may be cashable for a value less than face value or combinations thereof.

A second event may occur that returns the gaming machine from the second game of chance to the first game of chance. The second event may be the bonus credits available for wagers on the second game of chance dropping to zero or dropping below a threshold value or the player playing the second game of chance an allotted number of times. In one embodiment, the player may be able to input additional cash or indicia of credit into to the gaming machine to continue playing the second game of chance and prevent the gaming machine from returning from the second game of chance to the first game of chance. In another embodiment, another event such as a particular outcome appearing in the second game of chance, a player input or an input from a remote gaming device may trigger the switch from the second game of chance to the first game of chance.

In particular embodiments of the present invention, the gaming machine may be operable to instantiate two or more different game play interfaces. Each game play interface may include a display, mechanical or video, and one or more input devices, such as mechanical input buttons or touch screen input buttons that allow a game of chance to be played. A few examples of game play interfaces may include but are not limited a slot reel display and mechanical input buttons, a video display and mechanical inputs and/or touch screen inputs. The input buttons may be coupled to the gaming machine or to a peripheral device coupled to the gaming machine, such as the player tracking system 120. The gaming machine 102 may include multiple displays, such as display in top box 104 or the player tracking system 120, or the ability to split a single display, such as a display 110. Thus, the gaming machine 102 may be operable to instantiate two or more game play interfaces at the same time that allow two or more games of chance to be played concurrently.

Each of the games of chance played concurrently may be played in a manner according to any of the embodiments described above. For example, each game of chance may be switched from a first progressive game to a second progressive, between a progressive game and a non-progressive, or from a first game of chance to a second game of chance where the first game of chance includes a bonus outcome that is a chance to play a second game of chance with a chance to win a wide area progressive jackpot. The different games of chance that are played concurrently may be selected from the group consisting of a bingo game, a centrally determined game, a card game, a slot game, a dice game, a poker game, a pachinko games, a multiple hand poker game, a pai-gow poker game, a black jack games, a keno game, a roulette game, a craps game, checkers and a board game. Details of concurrent game play that may be used with the present invention are described in co-pending U.S. application Ser. No. 10/674,664, filed Sep. 29, 2003, "Parallel Games on a Gaming Machine", by Brosnan, which is incorporate herein in its entirety and for all purposes.

Returning to FIG. 1, a particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 108 may also communicate with EFT system 112, bonus system 114, EZPay™ system 116 (a proprietary cashless ticketing system of the present assignee), and player tracking system 120. The systems of the gaming machine 102 communicate the data onto the network 122 via a communication board 118.

In general, the dedicated communication network is not accessible to the public. Due to the sensitive nature of much of the information on the dedicated networks, for example, electronic fund transfers and player tracking data, usually the manufacturer of a host system, such as a player tracking system, or group of host systems, employs a particular networking language having proprietary protocols. For instance, 10-20 different companies produce player tracking host systems where each host system may use different protocols. These proprietary protocols are usually considered highly confidential and not released publicly. Thus, whenever a new host system is introduced for use with a gaming machine, rather than trying to interpret all the different protocols utilized by different manufacturers, the new host system is typically designed as a separate network. Consequently, as more host systems are introduced, the independent network structures continue to build up in the casino. Examples of protocol mediation to address these issues may be found, for example, in U.S. Pat. No. 6,682,423, "Open Architecture Communications in a Gaming Network," which is hereby incorporated by reference in its entirety.

Further, in the gaming industry, many different manufacturers make gaming machines. The communication protocols on the gaming machine are typically hard-coded into the gaming machine software, and each gaming machine manufacturer may utilize a different proprietary communication protocol. A gaming machine manufacturer may also produce host systems, in which case their gaming machines are compatible with their own host systems. However, in a heterogeneous gaming environment, such as a casino, gaming machines from many different manufacturers, each with their own communication protocol, may be connected to host systems from many different manufacturers, each with their own communication protocol. Therefore, communication compatibility issues regarding the protocols used by the gaming machines in the system and protocols used by the host systems must be considered.

In the present illustration, the gaming machines, 102, 130, 132, 134, and 136 are connected to a dedicated gaming network 122. In general, the DCU 124 functions as an intermediary between the different gaming machines on the network 122 and the host server 128. In general, the DCU 124 receives data transmitted from the gaming machines and sends the data to the host server 128 over a transmission path 126. In some instances, when the hardware interface used by the gaming machine is not compatible with the host server 128, a translator 125 may be used to convert serial data from the DCU 124 to a format accepted by the host server 128. The translator may provide this conversion service to a plurality of DCUs, such as 124, 140 and 141.

Further, in some dedicated gaming networks, the DCU 124 can receive data transmitted from the host server 128 for communication to the gaming machines on the gaming network. The received data may be communicated synchronously to the gaming machines on the gaming network. Within a gaming establishment, the gaming machines 102, 130, 132, 134 and 136 are located on the gaming floor for player access while the host server 128 is usually located in another part of gaming establishment 101 (e.g. the backroom), or at another location.

In a gaming network, gaming machines, such as 102, 130, 132, 134 and 136, may be connected through multiple communication paths to a number of gaming devices that provide gaming services. For example, gaming machine 102 is connected to four communication paths, 122, 148, 149 and 150. As described above, communication path 122 allows the gaming machine 102 to send information to host server 128. Via communication path 148, the gaming machine 102 is connected to a clerk validation terminal 142. The clerk validation terminal 142 is connected to a translator 143 and a cashless system server 144 that are used to provide cashless gaming services to the gaming machine 102. Gaming machines 130, 132, 134 and 136 may also be connected to the clerk validation terminal 142 and may also receive cashless system services.

Gaming machines 130, 132, 134 and 136 are connected to WAP device 146 and progressive system server 147. Other gaming machines may also be connected to WAP device 146 and/or progressive system server 147, as will be described below with reference to FIG. 4. Via communication path 150, the gaming machine 102 may be connected with additional gaming devices (not shown) that provide other gaming services.

In some embodiments of the present invention, gaming machines and other devices in the gaming establishment depicted in FIG. 1 are connected to a central system and/or other gaming establishments via one or more networks, which may be public or private networks. For example, host server 128 and/or progressive system server 147 may be connected to an outside network. In other embodiments, a bingo server, a switch, or another type of network device may be part of an interface with an outside network. A network device that links a gaming establishment with another gaming establishment and/or a central system will sometimes be referred to herein as a "site controller."

FIG. 2A is a screen layout 300 for one embodiment of the present invention. The screen layout 300 may be displayed on one or more displays coupled to the gaming machine 102 as shown in FIG. 1. These displays include a main display for presenting a video display of chance, secondary displays coupled to the main cabinet or top box of the gaming machine 102, a display coupled to the player tracking system or a portion of the main display.

The screen message includes information regarding six different progressive games 303 that are available for display on a gaming machine. The message says "Play Megajackpots," which refers to the idea that each of the wide area progressive jackpots 304 for each of the six progressive games is above one million dollars. The jackpots 304 may be regularly updated with information received from one or more wide area progressive systems as described with respect to FIG. 1.

As described with respect to FIG. 1, the player may select one or more of these progressive games to play in a serial manner (one at a time and one after the other) or to play concurrently (two or more at the same time). A player may select one of the progressive games for play on the gaming machine using mechanical or touch screen input buttons or other active input selection devices coupled to the gaming machine. The selection of a particular progressive game may trigger a number of changes on the gaming machine as was described with respect to FIG. 1. In one embodiment, the player may be required to select one of the progressive games before beginning game play. If the player does not make a selection, the gaming machine may automatically select or revert to a default progressive selection.

FIG. 2B shows a second screen layout 302. The second screen layout 302 shows four non-progressive games 307 and two progressive games 308 that are available for play on the gaming machine. The progressive games 307 include corresponding jackpots 308 that may be regularly updated. The screen message 305, "Select a Game," encourages the player to select a game of chance for play on the gaming machine. An additional message, "Play Megajackpots," is displayed near the progressive games 306. The second screen layout 302 may be displayed on any video display coupled to the gaming machine.

A player may select one of the games using input buttons and/or input devices coupled to the gaming machine. In one embodiment, the screen layout 302 may be projected to a video touch screen display and the player may simply touch the screen to make a selection. Depending on a sequence of player selections, a number of different changes may be made on the gaming machine. For instance, the gaming machine may have to switch between a first non-progressive game and a second non-progressive game, a first non-progressive game and a first progressive game, a first progressive game and a second progressive or between a first progressive game and a first non-progressive game. These switches may result in various changes on the gaming machine as are described with respect to FIG. 1.

FIGS. 3A-3D are flow charts of a WAP bonus flow methodology of the present invention. The WAP bonus methodology is also described above with respect to FIG. 1. The methods described for the WAP bonus games are also applicable to other embodiments describing the use of WAP games as described with respect to FIG. 1.

Figure 3A:
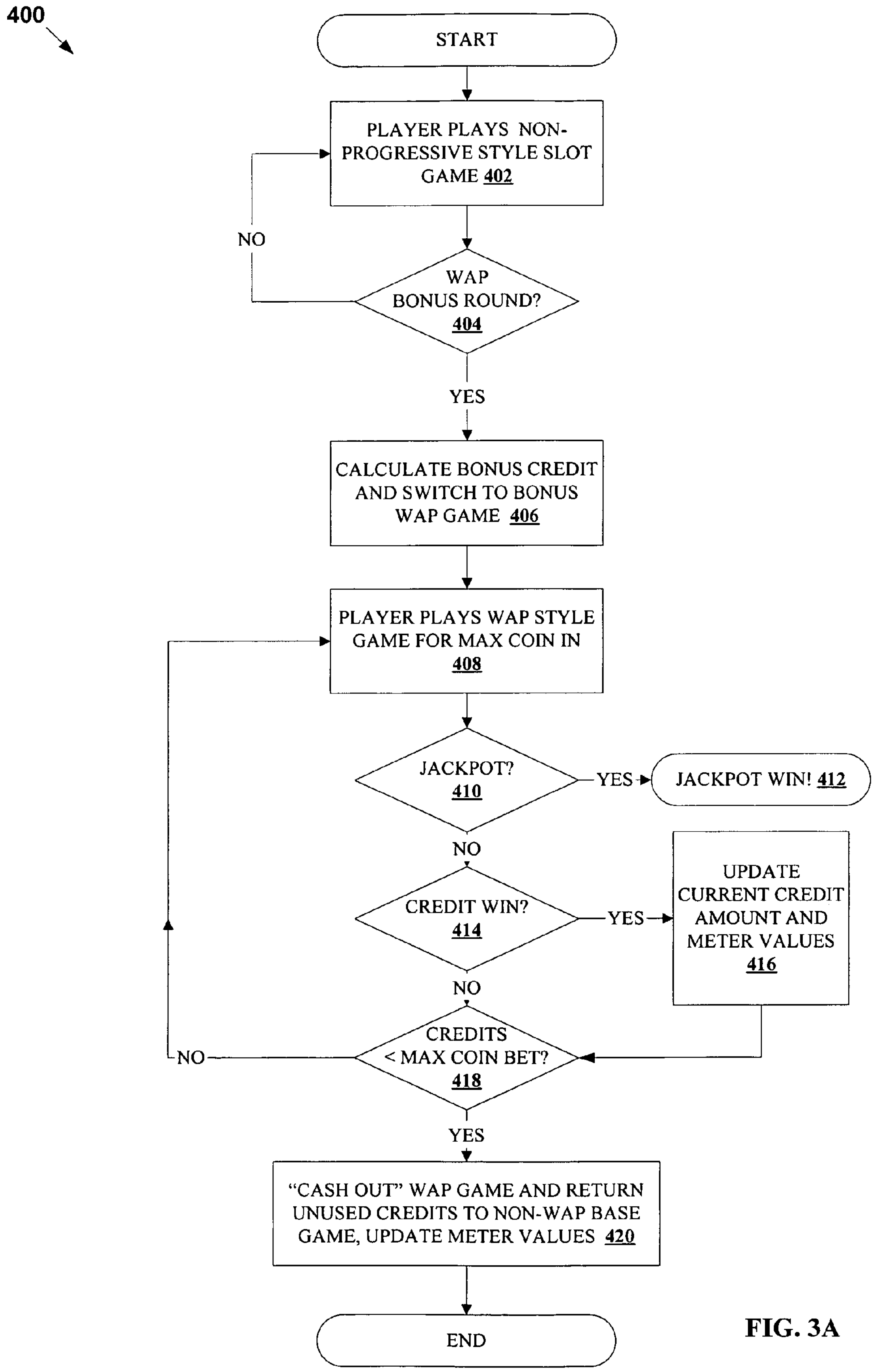
FIGS. 3A-3D are four flow charts describing different bonusing methods of the present invention.

FIG. 3A shows a first embodiment 400 of the WAP bonus flow methodology. In 402, a non-progressive style game of chance is played on a gaming device. In particular embodiments, the game of chance may be a slot game, mechanical or video. In the case of a mechanical slot game, the WAP bonus game may be displayed on a secondary display coupled to the gaming device.

In 404, the gaming device checks to determine if a WAP bonus round has been triggered. As described with respect to FIG. 1, the WAP bonus round may be triggered when a particular bonus event occurs on the gaming device. When a WAP bonus round has not been triggered, play of the non-progressive game may continue.

In 406, when a first event has occurred that triggers the WAP bonus round, the gaming device may determine parameters that govern how many times the WAP bonus game is to be played. For example, in one embodiment, the gaming device may determine that the WAP bonus game can be played an allotted number times (e.g., 1-10 times). In another embodiment, a number of bonus credits may be awarded that allow the WAP bonus game to be played up to a allotted number of times. In some instances, the player may have the option of cashing out the bonus credits and playing the WAP bonus game less than the allotted number of times as specified by the bonus credits (see FIG. 3D).

In 406, after the initial parameters of the WAP bonus game are determined, the gaming machine may be reconfigured to allow it to play the WAP bonus game. The reconfiguration may include loading and executing new game software, changing paytables, sounds, graphics, etc. on the gaming device. In some embodiments, new game software, paytables, sounds, graphics or other needed components used to generate the WAP bonus game may be downloaded from a remote gaming device.

In 408, the WAP bonus game is played. Each time the WAP bonus game is played or prior to starting the play of the WAP bonus game in 408, the gaming device may determine an amount to contribute to the WAP jackpot. The gaming device may notify the WAP system of its contribution after receiving a poll from a WAP server on the WAP system or the gaming device may initiate the communication of its contribution amount to the WAP server. Prior to beginning the play of the WAP game, the gaming device may establish communications with the WAP server and may request permission to join the WAP game.

In one embodiment, the amount contributed to the WAP jackpot may be a percentage of a max coin bet. As described with respect to FIGS. 1 and 3D for instance, the present invention is not limited to using a max coin bet in a progressive game. For example, in multi-denomination games, a threshold amount may be used instead of a max coin bet.

In 408, the player may be allowed to make a second wager on the WAP bonus game or the player may play the WAP bonus game without being allowed to specify a wager. For instance, in a slot style WAP bonus game, the player may be allotted a number of pulls (i.e., chances) to play the slot game and the wager amount may be fixed for each game. For the purposes of determining a contribution to the WAP jackpot, a wager may be associated with the game even though the player does not make the wager.

In 410, the gaming device determines whether the player has won the WAP jackpot. In 412, when the play wins the WAP jackpot, the gaming device may notify the player of their win. In 414, the gaming device determines whether additional bonus credits have been won. In the present invention, the WAP bonus game may specify a number of outcomes according to a payout schedule for the game, separate from the chance to win the WAP jackpot, where additional credits are awarded.

In 416, when additional credits are awarded, the current credit amount is updated and meter values are updated. In one embodiment, when credits are awarded in 414, the credits may only be used to play the WAP bonus game. In other embodiments, the credits may be transferred for play of the non-progressive game in 402 only (i.e., the credits may not be cashed out and may only be used for play of the non-progressive game). In yet another embodiment, when credits are awarded in 414, the credits may be cashed out of the gaming device for fill face value or for a value less than face value of the credit.

In 418, an embodiment is shown where any credits initially awarded to play the WAP bonus game or awarded during the play of the WAP bonus game are used to play the WAP bonus game as long as the available credits are greater than or equal to the max coin bet. When the available credits are greater than or equal to the max coin bet, the player continues to play the WAP bonus game in 408.

When the available credits are less than the max coin bet, in 420, the gaming device returns to the non-WAP base game in 402 and updates its meter values. The switch to the non-WAP base game in 402 may require the gaming machine to change graphics, sounds, game software, a paytable, etc. In one embodiment, in 420 any unused credits may be cashed out and returned to the non-WAP base game or may be awarded to the player.

Figure 3B:
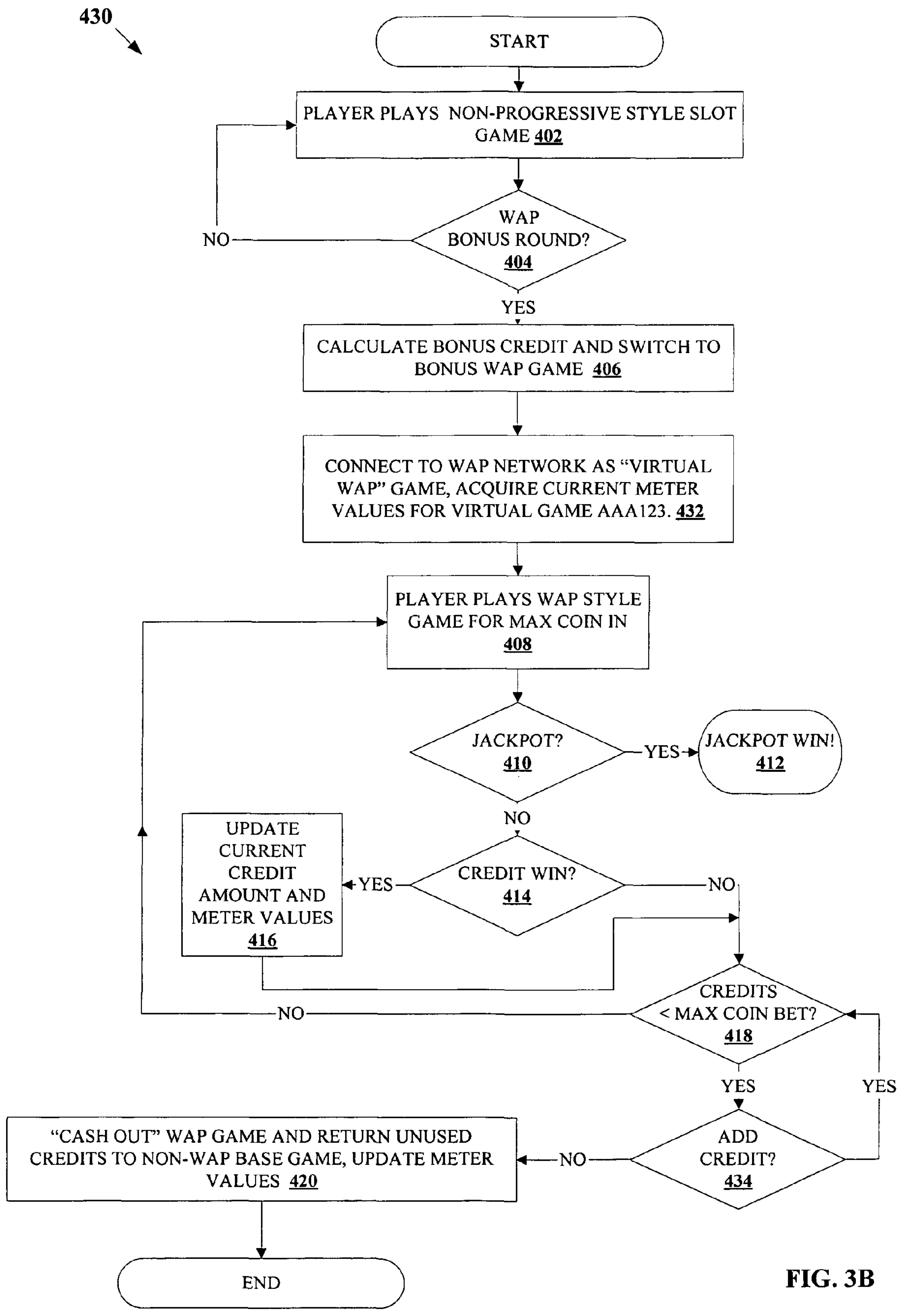

In FIG. 3B, a second embodiment 430 of the WAP bonus flow methodology is shown in a flow chart. In FIG. 3B, in 432, after a WAP bonus game is triggered in 404 and some initial parameters for the WAP bonus game are calculated in 406, the gaming device contacts a remote gaming device that provides play of the WAP bonus game on the gaming device. The remote gaming device may generate the WAP bonus game in a manner such that it can be displayed on the gaming device. For instance, the remote gaming device may video stream the results of the WAP bonus game to the gaming device. In this embodiment, the gaming device may act as an extension to the remote gaming device in that the gaming device may receive inputs that affect the play of the WAP bonus game, may transmit these inputs to the remote gaming device and may receive commands and/or information from the remote gaming device that affects what is displayed on the gaming device, but, the generation of the WAP bonus game may be controlled by the remote gaming device.

In a particular embodiment of 430, the WAP bonus game is played in a manner similar as what was described with respect to FIG. 3A. In 434, however, when the available credits fall below the max coin bet in 418, the player may be allowed to deposit additional cash or indicia of credit into the gaming device. The additional credits may be used to allow the player to continue playing the WAP bonus game rather than returning to the non-WAP base game.

Figure 3C:
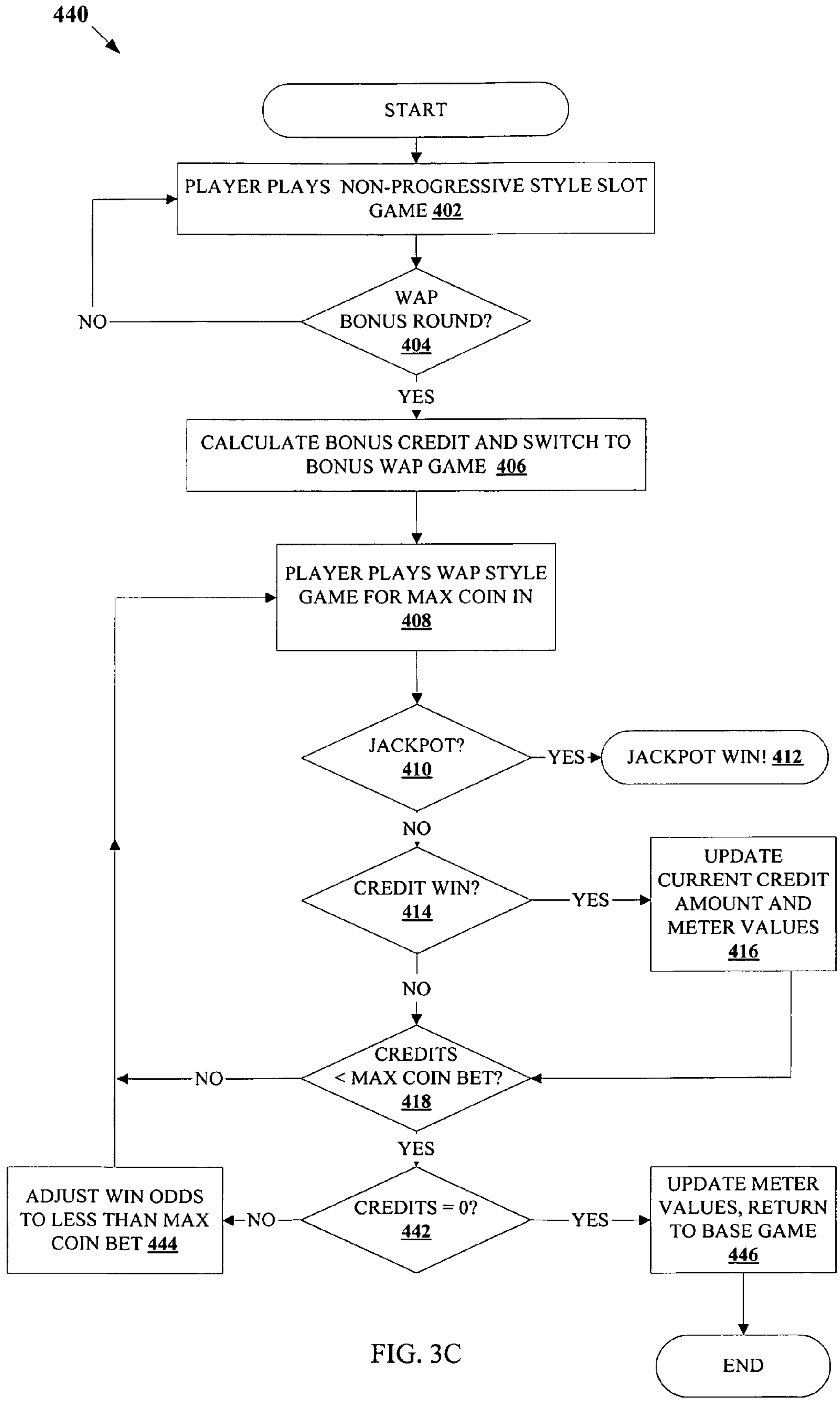

In FIG. 3C, a third embodiment 440 of the WAP bonus flow methodology is shown in a flow chart. In FIG. 3C, the game playing methodology is similar to what was described in FIG. 3A. One difference is that after the credits fall below a max coin value or below some threshold value that allows the player to win the WAP jackpot, the player may continue to play until the available credits are equal to zero.

In 442, the available credits are checked. When the credits are equal to zero, in 446, meter values are updated and the gaming device is returned to the base game in 402. In 444, when the available credits are less than the max coin bet but greater than zero, the odds of winning the WAP jackpot may be decreased to account for the lower wager. In some embodiments of the present invention, rather adjusting the odds, the amount of the WAP jackpot that can be won may be decreased by some amount to account for the lower wager. For example, for a wager of a ½ the max coin bet, the player may be eligible to win half of the WAP jackpot. In yet another embodiment of the present invention, the odds winning the WAP may be increased for making a wager that is above some threshold value. For example, if the odds of winning the WAP jackpot are based on the max coin bet, then a wager of twice the max coin bet could double the odds of winning the WAP jackpot.

Figure 3D:
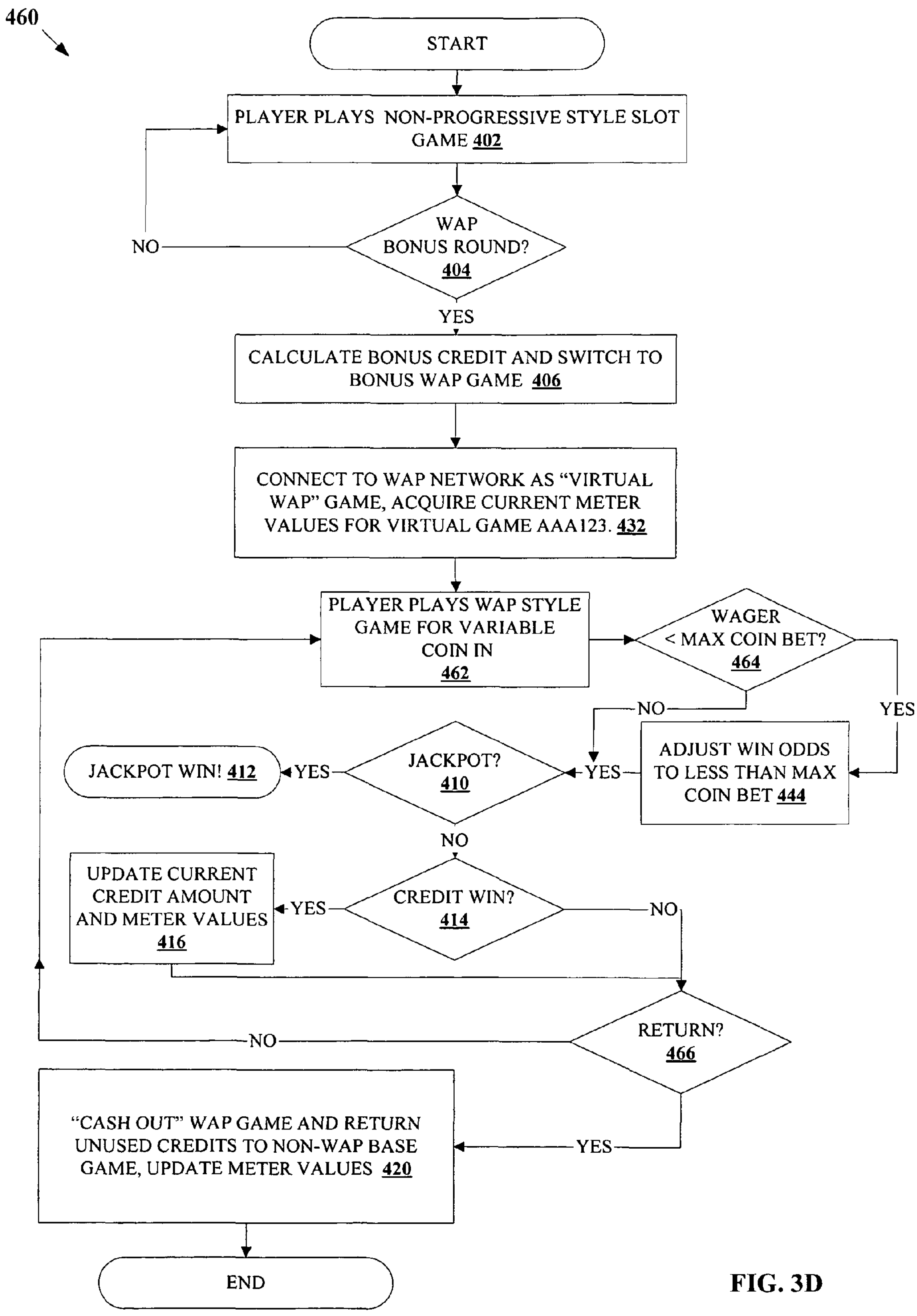

In FIG. 3D, a fourth embodiment 460 of the WAP bonus flow methodology is shown in a flow chart. In FIG. 3D, the game playing methodology leading up to the play of the WAP bonus game 462 is similar to what was described with respect to FIG. 3B. In 462, the player is allowed to specify a variable wager i.e., variable coin-in for the WAP game. In one embodiment, in 464, the gaming device compares the wager to a max coin bet or some other threshold amount. In 444, when the wager is less than the max coin bet, the odds of winning the WAP jackpot are adjusted. In another embodiment, in 444, the amount of the progressive jackpot that the player is eligible to win may be adjusted as a function of the wager amount.

As previously described with respect to FIG. 3B, the player may win the progressive jackpot or additional credits while playing the WAP bonus game. In 466, the player is given the choice to continue playing the WAP bonus game or returning to the non-WAP base game. In another embodiment, the base game could also be a progressive game. In 466, if the gaming device receives an input to return, the remaining credits may be transferred to the non-WAP base game. The transferred credits may or may not be cashable. When the credits are non-cashable, they may be only used for additional game play and may not be cashed out.

Figure 4:
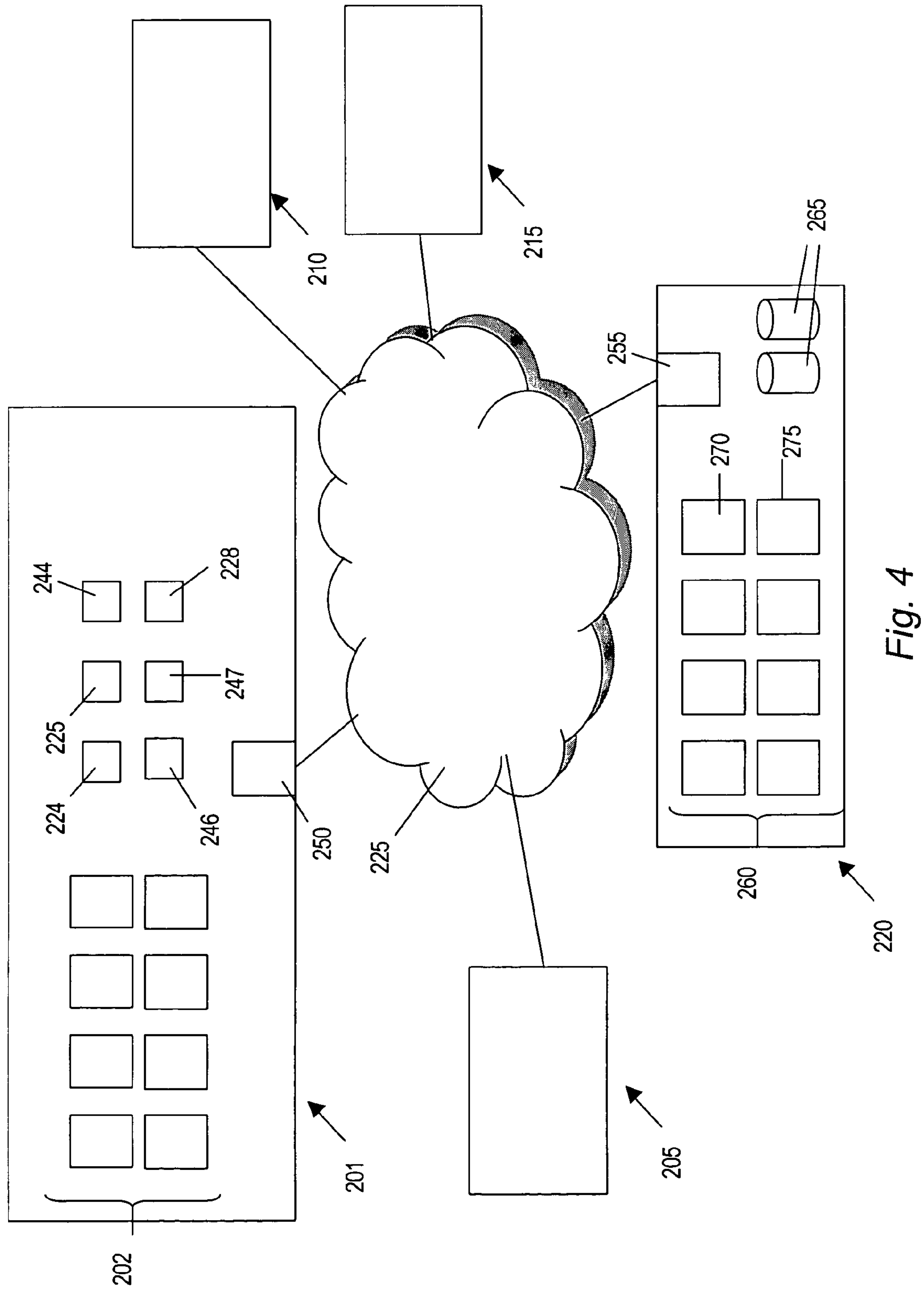
FIG. 4 is a network diagram depicting several gaming establishments configured for communication with a central system via a network that may be used to implement various embodiments of the present invention.

FIG. 4 is a simplified network diagram that illustrates a plurality of gaming establishments connected to a central system. In this example, gaming establishments 201, 205, 210 and 215 are connected to central system 220 via network 225. However, those of skill in the art will realize that more or fewer gaming establishments may be in communication with central system 220. Moreover, although central system 220 is depicted as having a single location, in alternate embodiments of the invention the devices that constitute central system 220 are in two or more locations.

In this example, network 225 is the Internet. However, it will be understood by those of skill in the art that network 225 could be any one of various other types of networks, such as the PSTN, a satellite network, a wireless network, a metro optical transport, etc. Accordingly, a variety of protocols may be used for communication on network 225, such as Internet Protocol ("IP"), Fibre Channel ("FC"), FC over IP ("FCIP"), Internet SCSI ("iSCSI," an IP-based standard for linking data storage devices over a network and transferring data by carrying SCSI commands over IP networks) or Dense Wavelength Division Multiplexing ("DWDM," an optical technology used to increase bandwidth over existing fiber optic backbones).

To transfer data in a secure manner, data transmitted over network 225 may be encrypted. In one embodiment of the present invention, an asymmetric encryption scheme incorporating a public-private encryption key pair may be used. Information encrypted with the private encryption key may be decrypted only using the corresponding public encryption key of the public-private encryption key pair and information encrypted with the public encryption key may be decrypted only using the private encryption key of the public-private encryption key pair. Thus, an entity with a private encryption key of public-private encryption key pair may give its public encryption key to many other entities. The public key may be made available (via an Internet server, e-mail, or some other means) to whoever needs or wants it. The private key, on the other hand, is kept secret. Only the owner of the key pair is allowed to possess the private key. The other entities may use the public encryption key to encrypt data. However, as long as the private encryption key remains private, only the entity with the private encryption key can decrypt information encrypted with the public encryption key.

In general, public-key encryption algorithms are very slow and it is impractical to use them to encrypt large amounts of data. In practice, symmetric algorithms are used for encryption/decryption of large amounts of data, while the public-key algorithms are used merely to encrypt the symmetric keys. Similarly, it is not usually practical to use public-key signature algorithms to sign large messages. Instead, a hash may be made of the message and the hash value may be signed. Methods of asymmetric and symmetric keys that may be used to transfer encrypted data in the present invention are described co-pending U.S. patent application Ser. No. 09/732,650, filed Dec. 7, 2000 by Nguyen et al. and entitled, "Secured Virtual Network in a Gaming Environment," which is incorporated herein in its entirety and for all purposes.

A private key of a public-private signature key pair may also be used to sign a message. The signature may be used for authenticating the message. When the private signature key is used to sign a message, then the public signature key must be used to validate the signature. The Digital Signature Standard (DSS) authorized by the U.S. government uses a private signature key, a public encryption key and a secure hash algorithm for generating and authenticating electronic signatures. For example, to send someone a digitally signed message, the message is signed with a private signature key, and the receiver of the message may verify the signature by using the public signature key corresponding to the private signature key. Prior to beginning a secure data transfer, a site controller and central system 220 may have exchanged public encryption keys or public signature keys and other security information that may be used to establish the identity of the sender of a message to central system 220 and to identify messages sent from central system 220. Details of exchanging encryption keys in a secure manner which may be applied to the present invention are described in co-pending U.S. application Ser. No. 09/993,163, by Rowe et al., filed Nov. 16, 2001 and entitled "A Cashless Transaction Clearinghouse," which are incorporated herein by reference in its entirety and for all purposes.

Gaming establishment 201 is a casino in this example. Gaming establishments 205, 210 and 215 could be any type of gaming establishments that are configured to participate in bonusing and/or progressive jackpots, such as casinos, Internet casinos, etc. Gaming establishments 205, 210 and 215 may have the same owner or different owners.

Gaming establishment 201 includes many of the features of gaming establishment 101, including gaming machines 202, DCU 224, translator 225, host server 228, cashless system server 244, WAP device 246 and progressive system server 247. Depending on the embodiment, there may be a single DCU 224 or multiple DCUs. Similarly, there may be one or more translators 225, according to the details of the implementation.

In the embodiment shown in FIG. 4, each gaming establishment includes a network device that acts as a site controller for interacting with central system 220 to provide progressive services. In one such implementation, e.g., progressive system server 247 is configured to act as a site controller for providing both bonusing services and progressive jackpot services. As will be discussed in more detail below, many of the functions involved in providing these services can be provided by either the site controller or the central system.

Gateway 250 is a network device with network address translation ("NAT") and firewall capabilities that can support multiple devices of gaming establishment 201 with a single external IP address. Gateway 255 provides NAT and firewall capabilities for central system 220. Internet service providers ("ISPs," which are not shown in FIG. 4) provide access to network 225 for gaming establishments 201, 205, 210 and 215, and central system 220.

In this example, central system 220 also includes multiple network devices 260 and storage devices 265. The number of network and storage devices shown is purely exemplary. Similarly, central progressive server 275 controls a progressive jackpot system for all participating gaming devices and gaming establishments. In some implementations, the same network device is used to provide both progressive jackpot and bonusing services. The provision of such services will be described in more detail below.

Central system 220 may provide additional services, including but not limited to cashless services, loyalty program services, auditing services, entertainment content services, communication services, gaming software services, prize services, bonusing etc. In some implementations, individual network devices may provide some or all of such services, whereas in other embodiments separate network devices, storage devices, etc., may be dedicated to providing such services.

Cashless services may include services and information related to, e.g., electronic fund transfers. Loyalty program services may include services and information related to the accumulation of player tracking points and the validation of player tracking points for services and prizes. Auditing/accounting services may include services and information relating to player identity, tracking the performance of different gaming activities, etc.

Entertainment content services may include information and services related to streaming video feeds and audio feeds to a client device of, for example, sporting events. Communications services may include information and services related to peer-to-peer communications between various devices in central system 220 and outside of central system 220, such as text messaging, voice communications, video feeds, e-mail, paging and locator services.

Gaming software services may include devices configured for downloading software to gaming devices. For instance, a game server may provide gaming software and gaming licenses used to play different games of chance on gaming devices. Further, the game server may be used to provide software upgrades and "bug" fixes for the gaming software. U.S. Pat. No. 6,645,077, which is hereby incorporated by reference, provides examples of such software services.

The prize services may include providing combinations of cash and non-cash prizes for awards on the client devices 110 and methods for redeeming the non-cash prizes. Progressive game services may be related to providing progressive jackpots for games of chance. Details of non-cash prize methods and game services that may be used with the present invention are described in co-pending U.S. application Ser. No. 09/515,717, filed on Feb. 29, 200, by Nguyen, and entitled "Name Your Prize Game Playing Methodology," which is incorporated herein in its entirety and for all purposes.

Figure 5:
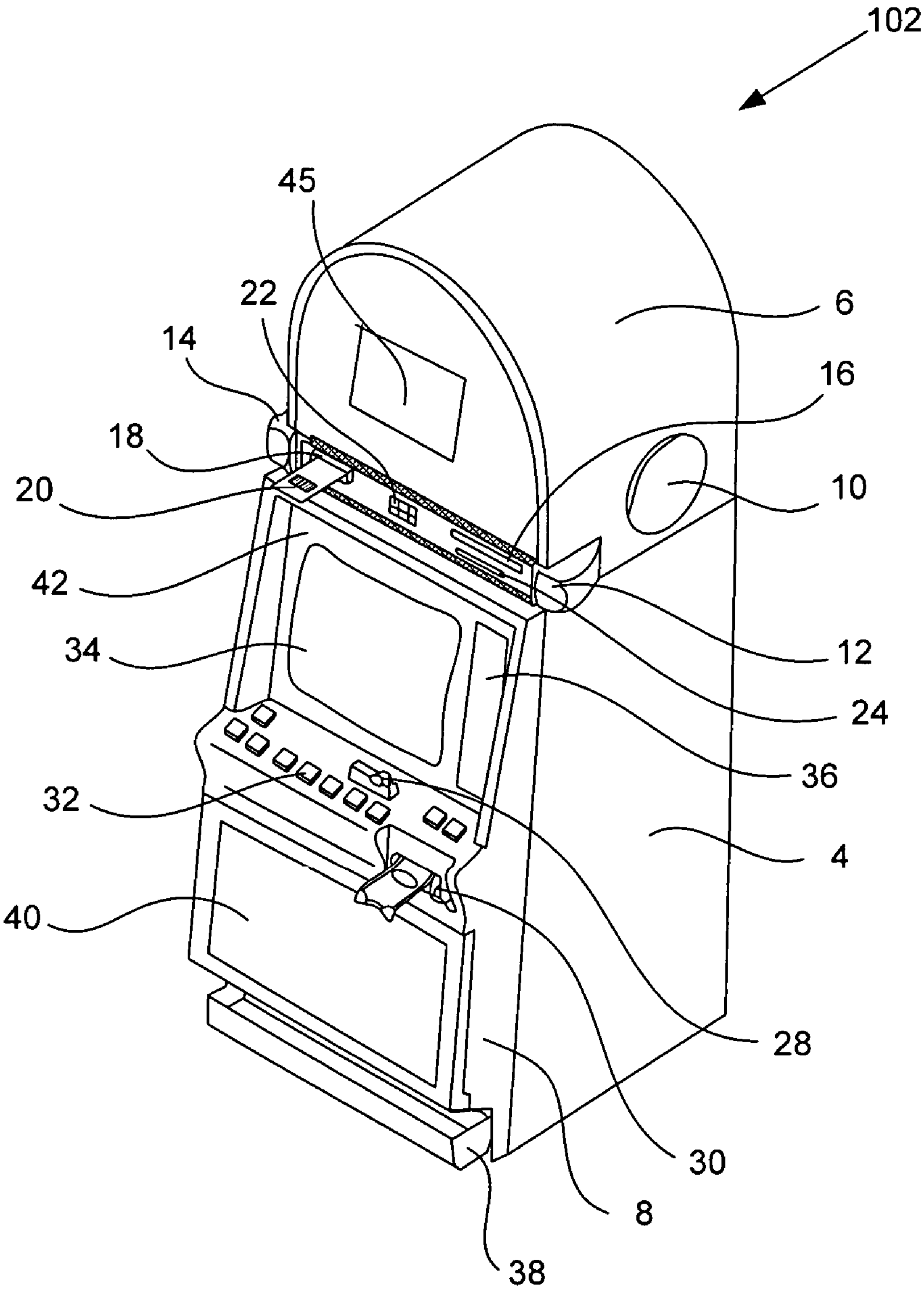
FIG. 5 illustrates a gaming device that may be used in accordance with various embodiments of the present invention.

Turning to FIG. 5, more details of gaming machine 102 are described. Machine 102 includes a main cabinet 4, which generally surrounds the machine interior (not shown) and is viewable by users. The main cabinet 4 includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. The bill validator 30, player-input switches 32, video display monitor 34, and information panel are devices used to play a game on the gaming machine 102. The devices are controlled by circuitry housed inside the main cabinet 4 of the machine 102.

The gaming machine 102 includes a top box 6, which sits on top of the main cabinet 4. The top box 6 houses a number of devices, which may be used to add features to a game being played on the gaming machine 102, including speakers 10, 12, 14, a ticket printer 18 which may print bar-coded tickets 20 used as cashless instruments. The player tracking unit mounted within the top box 6 includes a key pad 22 for entering player tracking information, a florescent display 16 for displaying player tracking information, a card reader 24 for entering a magnetic striped card containing player tracking information, a microphone 43 for inputting voice data, a speaker 42 for projecting sounds and a light panel 44 to display various light patterns used to convey gaming information. In other embodiments, the player tracking unit and associated player tracking interface devices, such as 16, 22, 24, 42, 43 and 44, may be mounted within the main cabinet 4 of the gaming machine, on top of the gaming machine, or on the side of the main cabinet of the gaming machine.

Understand that gaming machine 102 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modem general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Each function of the game (bet, play, result, etc.) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, etc. This is critical to ensure the player's wager and credits are preserved. Typically, battery backed RAM devices are used to preserve this critical data. These memory devices are not used in typical general-purpose computers.

IGT gaming computers normally contain additional interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 5, when a user wishes to play the gaming machine 102, he or she inserts cash through the coin acceptor 28 or bill validator 30. In addition, the player may use a cashless instrument of some type to register credits on the gaming machine 102. For example, the bill validator 30 may accept a printed ticket voucher, including 20, as an indicium of credit. As another example, the card reader 24 may accept a debit card or a smart card containing cash or credit information that may be used to register credits on the gaming machine. As another example, a bar-code reader may be used to read a bar-code from a printed ticket.

In other embodiments, as described with respect to FIG. 1, the player may deposit credits onto the gaming machine using an electronic fund transfer of some type. Further, a hand-held computer, a cell phone, an RFID (radio frequency identification tag) or other portable electronic device may be used to deposit credits on the gaming machine or store an indicia of credit output from the gaming machine. The gaming machine may include wireless, wired or contact interfaces to allow the gaming machine to read and/or write to each of the devices described above. Further details of input and output mechanisms that may be used with the present invention are described in co-pending U.S. application Ser. No. 10/214,936, filed Aug. 6, 2002, by Kaminkow, et al., entitled, "Flexible Loyalty Points Programs," which is incorporated herein in its entirety and for all purposes.

When odds are changed on the gaming machine, such as to adjust the odds of winning a progressive jackpot, the master gaming controller may select an appropriate paytable from a number of pre-approved paytables stored on the gaming machine. A gaming jurisdiction in which the gaming machine is located may pre-approve the paytables for use in game play on the gaming machine prior to installation of the gaming machine. The pre-approved paytables may be designed to account for different game play scenarios that may occur on the gaming machine. The gaming machine may select the pre-approved paytable based on game configuration information, such as a wager amount made on a game of chance or a game selection by a player. With pre-approved paytables, new probability information may not have to be generated on the "fly," when the odds to a game of chance are adjusted.

Returning to FIG. 5, during the course of a game, a player may be required to make a number of decisions, which affect the outcome of the game. For example, a player may vary his or her wager on a particular game, select a prize for a particular game, or make game decisions regarding gaming criteria that affect the outcome of a particular game. The player may make these choices using the player-input switches 32, the video display screen 34 or using some other device which enables a player to input information into the gaming machine. The player-input switches 32 may be used to play the game as well as to select games for play on the gaming machine.

During certain game functions and events, the gaming machine 102 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 102, from lights behind the belly glass 40 or the light panel on the player tracking unit 44.

In the present invention, the player may be to select a denomination for wagers (e.g., 1 cent, 3 cents, 5 cents, a quarter, a dollar, etc. in U.S. currency where other denominations are possible with other currents) and an amount to wager on each game of chance. As described with respect to FIG. 1, the gaming machine may be switched between different progressive games with different wide area progressive jackpots. The different progressive games may also use different denominations. Thus, in a switch over between games, credits in one denomination may have to be converted to credits another denomination. For example, 1 credit in a dollar denomination game may be converted to 4 credits in a quarter denomination game, if needed.

In the present invention, the amount wagered on a game of chance and a selected denomination can affect a player's chance to win a progressive jackpot and an amount contributed by the gaming machine to the progressive jackpot. For example, in many progressive games, a chance to win the progressive jackpot is only enabled when a wager on the progressive game is a maximum wager. In this example, the contribution to the progressive jackpot for each wager is always the same.

In one embodiment of the present invention, a chance to win a progressive jackpot may be enabled when the wager is above or equal to a threshold amount and disabled when the wager is below the threshold amount (also, above the threshold amount and below or equal to the threshold amount could be applied.). Thus, in a multi-denominational progressive game with one or more paylines, the chance to win the progressive jackpot may be enabled when the total wager on the paylines is above or equal to the threshold amount. The threshold amount may be a maximum or even a minimum wager for the game of chance. The threshold amount may be a parameter that can be adjusted on the gaming machine and may vary from progressive game to progressive game.

Using the threshold amount, the amount contributed to the progressive jackpot for each wager may be fixed or may vary. For example, the amount contributed to the progressive jackpot may be set as a fixed percentage of the threshold amount, such that for wagers over the threshold amount, the amount contributed to the progressive jackpot remains constant for each wager. In another embodiment, the percentage of the wager contributed to the progressive jackpot may be fixed. Thus, the amount contributed to the progressive jackpot may increase as the wager is increased over the threshold amount.

In another embodiment, the percentage of the wager removed may be fixed and the amount contributed to the progressive jackpot may be fixed at a percentage at the threshold amount for all wagers equal to or above the threshold amount. For wagers above the threshold amount, the additional funds, equal to the difference between the percentage of the wager taken out and the fixed contribution amount to the progressive jackpot, may be used to provide other player incentives, such as additional progressive games or bonus games, or the additional funds may be provided back to the gaming establishment where the gaming machine is located.

In one embodiment, the probability of winning the progressive jackpot in a progressive game may be variable. For example, the probability of winning a progressive jackpot in a progressive may be determined for a particular wager amount. For wagers above or below the particular wager amount, the probability of winning the progressive jackpot may be increased or decreased, respectively.

In yet another embodiment, the probability of winning the progressive in a progressive game may remain fixed. However, for wagers above or below a threshold amount, the fraction of the progressive jackpot that is awarded may be adjusted. For example, the total progressive jackpot may be awarded for wagers above or equal to a threshold amount and a graduated fraction of the progressive jackpot may be awarded from wagers below the threshold amount. Apparatus and methods for adjusting the probability of winning a progressive jackpot or awarding a fractional progressive jackpot that may be used with the present invention are described in U.S. Pat. No. 5,116,055 issued May 26, 1992, by Tracy, and entitled, "Progressive Jackpot Gaming System Linking Gaming Machines with Different Hit Frequencies and Denominations," and U.S. publication No. 2003/0181231, filed Jan. 17, 2003 and published Sep. 25, 2003, by Vancura, et al., and entitled "Progressive Gaming System and Method Having Fractional Awards," each of which is incorporated by reference herein in their entirety and for all purposes.

Returning to the FIG. 5, after the player has completed a game, the player may receive award credits, game tokens from the coin tray 38 or the ticket 20 from the printer 18, which may be used for further games or to redeem a prize. Further, the player may receive a ticket 20 for food, merchandise, or games from the printer 18. The type of ticket 20 may be related to past game playing recorded by the player tracking software within the gaming machine 102. In some embodiments, a game player may use the tickets to obtain gaming related services.

One related method of gaining and maintaining a game player's interest in game play involves player tracking programs that are offered at various casinos. Player tracking programs provide rewards to players that typically correspond to the player's level of patronage (e.g., to the player's playing frequency and/or total amount of game plays at a given casino). Player tracking rewards may be free meals, free lodging and/or free entertainment. These rewards may help to sustain a game player's interest in additional game play during a visit to a gaming establishment and may entice a player to visit a gaming establishment to partake in various gaming activities.

Figure 6:
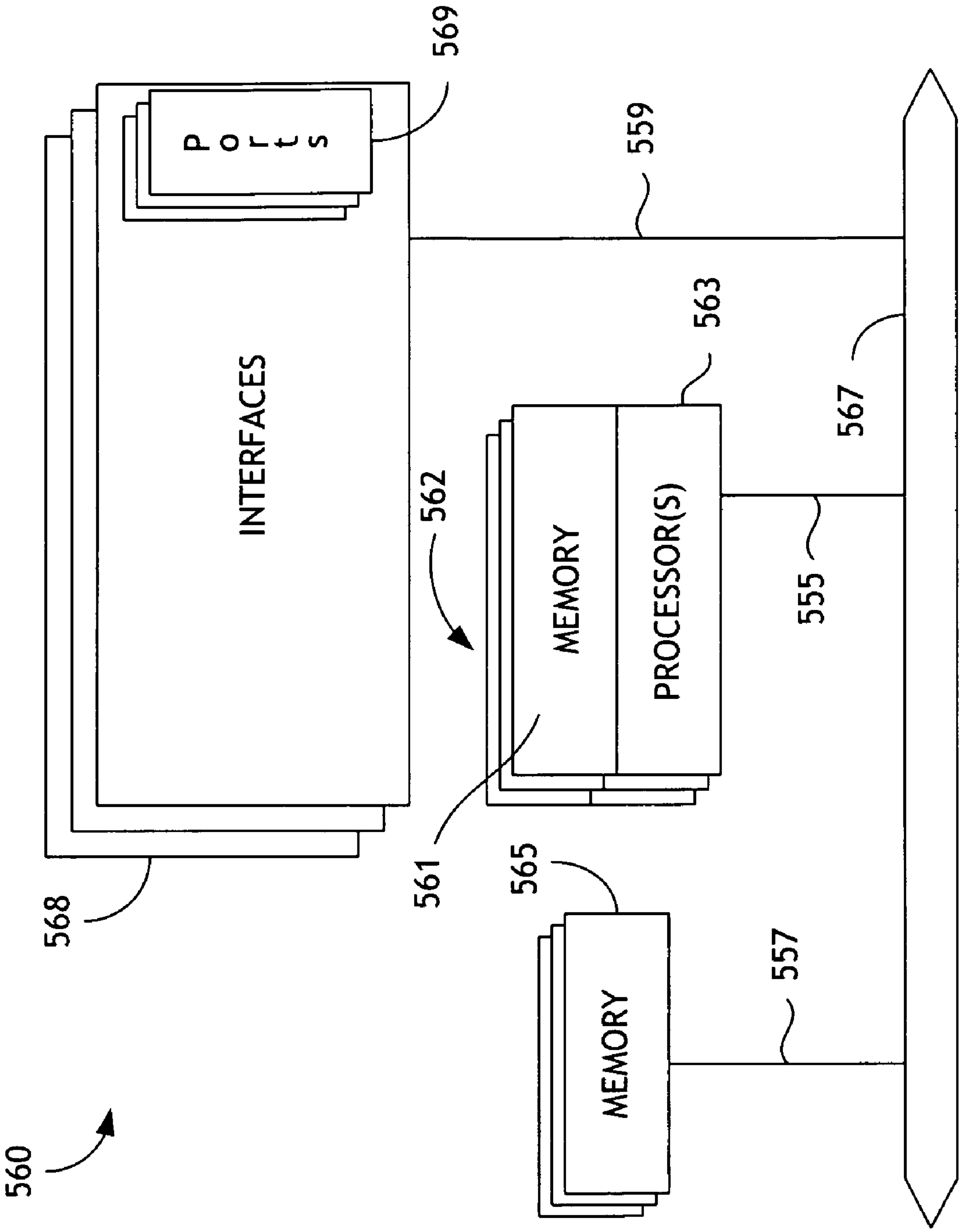
FIG. 6 is a block diagram of a network device that may be used to implement various embodiments of the present invention.

FIG. 6 illustrates an example of a network device that may be configured to implement some methods of the present invention. Network device 560 includes a master central processing unit (CPU) 562, interfaces 568, and a bus 567 (e.g., a PCI bus). Generally, interfaces 568 include ports 569 appropriate for communication with the appropriate media. In some embodiments, one or more of interfaces 568 includes at least one independent processor and, in some instances, volatile RAM. The independent processors may be, for example ASICs or any other appropriate processors. According to some such embodiments, these independent processors perform at least some of the functions of the logic described herein. In some embodiments, one or more of interfaces 568 control such communications-intensive tasks as media control and management. By providing separate processors for the communications-intensive tasks, interfaces 568 allow the master microprocessor 562 efficiently to perform other functions such as routing computations, network diagnostics, security functions, etc.

The interfaces 568 are typically provided as interface cards (sometimes referred to as "linecards"). Generally, interfaces 568 control the sending and receiving of data packets over the network and sometimes support other peripherals used with the network device 560. Among the interfaces that may be provided is FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 562 may be responsible for implementing specific functions associated with the functions of a desired network device. According to some embodiments, CPU 562 accomplishes all these functions under the control of software including an operating system and any appropriate applications software.

CPU 562 may include one or more processors 563 such as a processor from the Motorola family of microprocessors or the MIPS family of microprocessors. In an alternative embodiment, processor 563 is a specially designed hardware for controlling the operations of network device 560. In a specific embodiment, a memory 561 (such as non-volatile RAM and/or ROM) also forms part of CPU 562. However, there are many different ways in which memory could be coupled to the system. Memory block 561 may be used for a variety of purposes such as, for example, caching and/or storing data, programming instructions, etc.

Regardless of network device's configuration, it may employ one or more memories or memory modules (such as, for example, memory block 565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc., for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 6 illustrates one specific network device of the present invention, it is by no means the only network device architecture on which the present invention can be implemented. For example, an architecture having a single processor that handles communications as well as routing computations, etc., is often used. Further, other types of interfaces and media could also be used with the network device. The communication path between interfaces may be bus based (as shown in FIG. 6) or switch fabric based (such as a cross-bar).

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For instance, while the gaming machines of this invention have been depicted as having a top box mounted on top of the main gaming machine cabinet, the use of gaming devices in accordance with this invention is not so limited. For example, a gaming machine may be provided without a top box, or may have additional boxes or devices attached, or may be configured in bar tops, table tops, or other structures. Further, the location of the signature input devices on the gaming machine may vary widely in different embodiments. Additionally, the gaming network may be connected to other devices including other servers or gaming devices over the Internet or through other wired and wireless systems. Moreover, embodiments of the present invention may be employed with a variety of network protocols and architectures.

Thus, the examples described herein are not intended to be limiting of the present invention. It is therefore intended that the appended claims will be interpreted to include all variations, equivalents, changes and modifications that fall within the true spirit and scope of the present invention.

What is claimed:

1. A gaming machine for receiving a wager on a game chance, the gaming machine comprising:

a master gaming controller designed or configured a) to control the game of chance played on the gaming machine wherein an outcome for each game of chance is, respectively, an award of a wide area progressive jackpot among a plurality of wide area progressive jackpots accessed by said gaming machine, said wide area progressive jackpot a maximum award for the game of chance, and wherein a portion of each wager made on the gaming machine is contributed to the respective wide area progressive jackpot, b) to switch between a first game of chance including the respective outcome of an award of a first wide area progressive jackpot and a second game of chance including the respective outcome of an award of a second wide area progressive jackpot different from said first wide area progressive jackpot wherein the first game of chance and the second game of chance are each a type of the game of chance controlled by the master gaming controller, c) to terminate after a switch from the first game of chance to the second game of chance, a first communication session with a first remote gaming device that polls the gaming machine for contributions to the first wide area progressive jackpot and to establish a second communication session with a second remote gaming device that polls the gaming machine for contributions to the second wide area progressive jackpot, d) to maintain state information including credit information in a non-volatile memory such that after a power failure that gaming machine is restorable to a state prior to the power failure;

a first display coupled to the master gaming controller for displaying an outcome to the game of chance;

an input mechanism for inputting one or more of cash, indicia of credit or combinations thereof for the wager;

an output mechanism for outputting one of more of cash, indicia of credit or combinations thereof wherein the one of cash, indicia of credit or combinations thereof is output under control of the master gaming controller;

a network interface coupled to the master gaming controller for sending a message over a network regarding the portion of each wager contributed to each respective wide area progressive jackpot and a cabinet enclosing the master gaming controller, a portion of the input mechanism and a portion of the output mechanism wherein the first display, the input mechanism, the output mechanism and the network interface are coupled to the cabinet.

2. The gaming machine of claim 1, wherein the first display is a plurality of slot reels.

3. The gaming machine of claim 1, further comprising:

a second display for displaying one or more of an amount of the first wide area progressive jackpot, an amount of the second wide area progressive jackpot or combinations thereof.

4. The gaming machine of claim 1, wherein a wager amount is variable for each game of chance.

5. The gaming machine of claim 1, wherein a probability of winning the respective wide area progressive jackpot is variable.

6. The gaming machine of claim 1, wherein a portion of the respective wide area progressive jackpot, which is less than the maximum award, is awarded when the wager on the game of chance is less than a threshold wager amount.

7. The gaming machine of claim 1, wherein a denomination for each game of chance is variable.

8. The gaming machine of claim 1, wherein an amount contributed to the respective wide area progressive jackpot is variable as a function of an amount wagered on the game of chance.

9. The gaming machine of claim 1, wherein a denomination of the first wide area progressive jackpot is different from the denomination of the second wide area progressive jackpot.

10. The gaming machine of claim 1, wherein an amount of the first wide area progressive jackpot is different from the amount of the second wide area progressive jackpot.

11. The gaming machine of claim 1, wherein a probability of winning the first wide area progressive jackpot is different from the probability of winning the second wide area progressive jackpot.

12. The gaming machine of claim 1, wherein, after a switch from the first game of chance to the second game of chance, one or more of a theme, graphics, sounds, a paytable, game software, or combinations thereof that are used to generate the game of chance is changed on the gaming machine.

13. The gaming machine of claim 1, wherein all or a portion of the game of chance presented on the first display is generated on a remote gaming device.

14. The gaming machine of claim 1, wherein the master gaming controller is operable to receive a video stream of a presentation for the game chance from a remote gaming device and to display the video stream on the gaming machine.

15. The gaming machine of claim 1, wherein the master gaming controller is further designed or configured to establish a communication session with a remote gaming device that polls the gaming machine for contributions to the wide area progressive jackpot.

16. The gaming machine of claim 1, wherein the master gaming controller is further designed or configured to receive updates of an amount of the first wide area progressive jackpot from a first remote gaming device and to receive updates of an amount of the second wide area progressive jackpot from a second remote gaming device.

17. The gaming machine of claim 1, wherein a switch from the first game of chance to the second game of chance is triggered from an event generated at one or more of the gaming machine, a remote gaming device or combinations thereof.

18. The gaming machine of claim 1, wherein a switch from the first game of chance to the second game of chance is triggered as a result of a player input at the gaming machine.

19. The gaming machine of claim 1, wherein the gaming machine is operable to display a plurality of wide area progressive jackpots available for play on the gaming machine and to receive an input for selecting one of the plurality of wide area progressive jackpots available for play.

20. The gaming machine of claim 1, wherein the first display is a video display.

21. The gaming machine of claim 1, wherein the gaming machine is further designed or configured to generate a message including information regarding an amount contributed to the wide area progressive jackpot wherein the message further includes routing information that allows the message to be routed to one of plurality remote gaming devices that each provide a different wide area progressive jackpot.

22. The gaming machine of claim 1, wherein the master gaming controller is further designed or configured to switch from a first paytable to a second paytable wherein the paytables are not dynamically generated and are pre-approved for use on the gaming machine prior to the switch.

23. The gaming machine of claim 1, further comprising: a first input mechanism for receiving input from one or more of an RFID tag, a cell phone, a magnetic striped card, a smart card, a printed voucher and a hand-held computer.

24. The gaming machine of claim 1, wherein the input mechanism is selected from the group consisting of a bill validator, a card reader, a printed voucher acceptor, a coin acceptor and a RFID tag reader.

25. The gaming machine of claim 1, wherein the output mechanism is selected from the group consisting of a coin hopper, a voucher printer, RFID tag programmer and a card reader.

26. The gaming machine of claim 1, wherein the game of chance is selected from the group consisting of a bingo game, a centrally determined game, a card game, a slot game, a dice game, a poker game, a pachinko games, a multiple hand poker game, a pai-gow poker game, a black jack games, a keno game, a roulette game, a craps game, checkers and a board game.

27. The gaming machine of claim 1, wherein the master gaming controller is further designed or configured to control concurrently and to present concurrently the first game of chance and a third game of chance with a third wide area progressive jackpot.

28. The gaming machine of claim 1, wherein the input mechanism is designed or configured to receive an electronic funds transfer of cash or indicia of credit.

29. The gaming machine of claim 1, wherein the output mechanism is designed or configured to output an electronic funds transfer of cash or indicia of credit for storage on a remote gaming device.

30. The gaming machine of claim 4, wherein an award of each wide area progressive jackpot is enabled when the wager amount on each game of chance is above or equal to a threshold wager amount or the respective wide area progressive jackpot is disabled when the wager on each game of chance is below the threshold amount.

31. The gaming machine of claim 30, wherein the respective threshold wager amount is a maximum wager amount for the game of chance.

32. The gaming machine of claim 30, wherein the respective threshold wager amount is a minimum wager amount for the game of chance.

33. The gaming machine of claim 5, wherein the probability is varied as one or more of a function of an amount contributed to the respective wide area progressive jackpot, an amount wagered on the game of chance or combinations thereof.

34. The gaming machine of claim 6, wherein the portion is a percentage of the maximum award and is variable.

35. The gaming machine of claim 34, wherein the portion is variable as a function of a wager amount on the game of chance.

36. The gaming machine of claim 12, wherein the one or more of a graphics, sounds, a paytable, game software or combinations thereof is downloaded from a remote gaming device.

37. The gaming machine of claim 16, wherein the first remote gaming device and the second remote gaming device are the same gaming device.

38. The gaming machine of claim 19, wherein the display of the plurality of wide area progressive jackpots or the input for selecting one of the plurality of wide area progressive jackpots is made via a player tracking unit coupled to the gaming machine.

39. The gaming machine of claim 19, wherein the first display is a video display and the plurality of wide area progressive jackpots available for play on the gaming machine are displayed on the video display.

40. The gaming machine of claim 19, wherein the first display is a touch screen enabled video display and wherein the plurality of wide area progressive jackpots available for play are displayed on the touch screen enabled video display and the input for selecting one of the plurality of wide area progressive jackpots is made via the touch screen enabled video display.

41. The gaming machine of claim 19, further comprising a second display different from said first display wherein the plurality of wide area progressive jackpots available for play are displayed on the second display.

42. The gaming machine of claim 19, further comprising one or more mechanical input buttons or touch screen input buttons wherein an input for selecting one of the plurality of wide area progressive jackpots available for play is made via the one or more mechanical input buttons or touch screen input buttons.

43. The gaming machine of claim 19, wherein the display of the plurality of wide area progressive jackpots available for play on the gaming machine includes information regarding each of the wide area progressive jackpots.

44. The gaming machine of claim 43, the information includes one or more of a jackpot amount for each of the wide area progressive jackpots, a denomination for each of the wide area progressive jackpots, a minimum wager required for each of the wide area progressive jackpots, a theme associated with each of the wide area progressive jackpots, a payout schedule associated with each of the wide area progressive jackpots, a demo game associated with each of the wide area progressive jackpots or combinations thereof.

45. The gaming machine of claim 27, wherein the first game of chance is presented on the first display and the third game of chance is presented on a second display.

46. The gaming machine of claim 27, wherein the first game of chance is presented on a first portion of the first display and the third game of chance is presented on a second portion of the first display.

47. The gaming of claim 27, wherein the master gaming controller is further designed or configured to switch between the third game of chance including the third wide area progressive jackpot and the second game of chance including the second wide area progressive jackpot.

* * * * *